(12) United States Patent
Tomita et al.

(10) Patent No.: US 10,302,902 B2
(45) Date of Patent: *May 28, 2019

(54) FOCUS ADJUSTMENT APPARATUS, IMAGING APPARATUS AND LENS BARREL

(71) Applicant: NIKON CORPORATION, Tokyo (JP)

(72) Inventors: Hiroyuki Tomita, Tokyo (JP); Toshiaki Maeda, Tokyo (JP)

(73) Assignee: NIKON CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/461,151

(22) Filed: Mar. 16, 2017

(65) Prior Publication Data

US 2017/0184811 A1 Jun. 29, 2017

Related U.S. Application Data

(60) Division of application No. 14/267,348, filed on May 1, 2014, now Pat. No. 9,635,239, which is a
(Continued)

(30) Foreign Application Priority Data

Nov. 11, 2011 (JP) .................................. 2011-247090

(51) Int. Cl.
*G02B 7/38* (2006.01)
*G03B 13/36* (2006.01)
(Continued)

(52) U.S. Cl.
CPC ................. *G02B 7/38* (2013.01); *G02B 7/09* (2013.01); *G02B 7/282* (2013.01); *G02B 7/34* (2013.01);
(Continued)

(58) Field of Classification Search
CPC . G02B 7/38; G02B 7/09; G02B 7/282; G02B 7/34; G03B 17/565; G03B 13/36; G03B 2206/00; G03B 3/10; H04N 5/3696
See application file for complete search history.

(56) References Cited

U.S. PATENT DOCUMENTS 5,079,582 A 1/1992 Hamada et al.
5,206,677 A 4/1993 Onuki et al.
(Continued)

FOREIGN PATENT DOCUMENTS

CN 1847901 A 10/2006
CN 101101429 A 1/2008
(Continued)

OTHER PUBLICATIONS

Mar. 26, 2018 Office Action Issued in U.S. Appl. No. 15/138,711.
(Continued)

*Primary Examiner* — Luong T Nguyen
(74) *Attorney, Agent, or Firm* — Oliff PLC

(57) ABSTRACT

A focus adjustment control apparatus is provided which includes: a focus detection unit that calculates an evaluation value with regard to contrast of an image via an optical system to detect a focus adjustment state of the optical system; an acquisition unit that acquires from a lens barrel at least one of a maximum value and a minimum value of an image plane movement coefficient that represents correspondence relationship between a movement amount of a focus adjustment lens included in the optical system and a movement amount of an image plane; and a control unit that uses at least one of the maximum value and the minimum value of the image plane movement coefficient to determine a drive speed for the focus adjustment lens when the focus detection unit detects the focus adjustment state.

11 Claims, 19 Drawing Sheets

Related U.S. Application Data continuation of application No. PCT/JP2012/079189, filed on Nov. 9, 2012.

(51) Int. Cl.

| | | |
|---|---|---|
| *G02B 7/28* | (2006.01) | |
| *G03B 17/56* | (2006.01) | |
| *G02B 7/09* | (2006.01) | |
| *G02B 7/34* | (2006.01) | |
| *G03B 3/10* | (2006.01) | |
| *H04N 5/232* | (2006.01) | |
| *H04N 5/369* | (2011.01) | |

(52) U.S. Cl.
CPC .............. *G03B 3/10* (2013.01); *G03B 13/36* (2013.01); *G03B 17/565* (2013.01); *H04N 5/23212* (2013.01); *H04N 5/3696* (2013.01); *G03B 2206/00* (2013.01)

(56) References Cited

U.S. PATENT DOCUMENTS

| | | | |
|---|---|---|---|
| 5,227,832 A | | 7/1993 | Kawasaki et al. |
| 6,208,811 B1* | | 3/2001 | Tanaka ..................... G02B 7/34 396/75 |
| 8,139,140 B2* | | 3/2012 | Yumiki .................. G03B 13/30 348/345 |
| 9,277,098 B2 | | 3/2016 | Shirakata |
| 9,635,239 B2* | | 4/2017 | Tomita ..................... G02B 7/34 |
| 2002/0127012 A1 | | 9/2002 | Okawara |
| 2004/0057712 A1 | | 3/2004 | Sato et al. |
| 2006/0232701 A1 | | 10/2006 | Ito et al. |
| 2007/0258710 A1 | | 11/2007 | Yamasaki |
| 2008/0007644 A1 | | 1/2008 | Matsumoto |
| 2009/0115883 A1* | | 5/2009 | Tsuchiya ................ G03B 13/00 348/345 |
| 2009/0251554 A1 | | 10/2009 | Kido et al. |
| 2010/0026821 A1 | | 2/2010 | Sato et al. |
| 2010/0091175 A1 | | 4/2010 | Shintani et al. |
| 2010/0128144 A1 | | 5/2010 | Tay |
| 2010/0157134 A1 | | 6/2010 | Kawarada |
| 2011/0141340 A1 | | 6/2011 | Yumiki et al. |
| 2011/0261251 A1* | | 10/2011 | Okamoto ............... G02B 7/102 348/345 |
| 2012/0026386 A1 | | 2/2012 | Tomita |
| 2012/0038818 A1 | | 2/2012 | Hamada |
| 2012/0307134 A1 | | 12/2012 | Morimoto |
| 2013/0010179 A1 | | 1/2013 | Takahara et al. |
| 2013/0022348 A1 | | 1/2013 | Hasuda et al. |
| 2014/0320736 A1 | | 10/2014 | Tomita et al. |

FOREIGN PATENT DOCUMENTS

| | | | |
|---|---|---|---|
| CN | 102819168 A | 12/2012 | |
| JP | H03-150513 A | 6/1991 | |
| JP | H04-315116 A | 11/1992 | |
| JP | H05-257055 A | 10/1993 | |
| JP | H05313062 A | 11/1993 | |
| JP | H08-76001 A | 3/1996 | |
| JP | H08-265620 A | 10/1996 | |
| JP | H09211648 A | 8/1997 | |
| JP | H11-84220 A | 3/1999 | |
| JP | 2000-019379 A | 1/2000 | |
| JP | 2002023041 A | 1/2002 | |
| JP | 2002-267924 A | 9/2002 | |
| JP | 2003-029135 A | 1/2003 | |
| JP | 2006-78660 A | 3/2006 | |
| JP | 2007233943 A | 9/2007 | |
| JP | 2008-052191 A | 3/2008 | |
| JP | 2008-158028 A | 7/2008 | |
| JP | 2008-241733 A | 10/2008 | |
| JP | 2009-145645 A | 7/2009 | |
| JP | 2010-139666 A | 6/2010 | |
| JP | 2012-032569 A | 2/2012 | |
| JP | 2013-057746 A | 3/2013 | |
| JP | 2014153615 A | 8/2014 | |
| JP | 2014219643 A | 11/2014 | |
| WO | 2013069795 A1 | 5/2013 | |

OTHER PUBLICATIONS

Jan. 31, 2018 Decision to Grant issued in Russian Patent Application No. 2014123677.
U.S. Appl. No. 15/138,711, filed Apr. 26, 2016 in the name of Tomita.
U.S. Appl. No. 15/522,585, filed Apr. 27, 2017 in the name of Tomita.
Dec. 16, 2016 Notice of Allowance issued in U.S. Appl. No. 14/267,348.
Aug. 12, 2014 International Search Report issued in International Patent Application No. PCT/JP2014/062529.
Oct. 2, 2015 International Preliminary Report on Patentability issued in International Patent Application No. PCT/JP2014/062529.
U.S. Appl. No. 14/934,574, filed Nov. 6, 2015 in the name of Tomita, et al.
Jun. 17, 2015 Partial Supplementary Search Report in European Patent Application No. 12847609.0.
Feb. 12, 2013 International Search Report issued in International Patent Application No. PCT/JP2012/079189.
Iijima, English Language Abstract of Japanese Patent Application Publication No. H04-315116 filed Jun. 11, 1992.
Oct. 8, 2015 Extended European Search Report issued in European Patent Application No. 12847609.0.
U.S. Appl. No. 14/267,348, filed May 1, 2014 in the name of Tomita, et al.
Jan. 19, 2016 International Search Report and Written Opinion issued in International Patent Application No. PCT/JP2015/081280.
Apr. 19, 2016 Office Action Issued in U.S. Appl. No. 14/267,348.
Jun. 14, 2016 Office Action issued in Japanese Patent Application No. 2013-543059.
Sep. 16, 2016 Extended Search Report issued in European Patent Application No. 14794746.9.
Sep. 26, 2017 Office Action issued in Japanese Patent Application No. 2016-191382.
Sep. 26, 2017 Office Action issued in Japanese Patent Application No. 2016-190995.
Jun. 30, 2017 Office Action issued in U.S. Appl. No. 15/138,711.
Mar. 27, 2018 Office Action issued in Japanese Patent Application No. 2017-039743.
Apr. 3, 2018 Office Action issued in Japanese Patent Application No. 2017-099025.
May 15, 2018 Office Action issued in Japanese Patent Application No. 2017-099024.
May 24, 2018 Search Report issued in European Patent Application No. 15857370.9.
May 3, 2018 Office Action issued in U.S. Appl. No. 15/522,585.
Feb. 5, 2019 U.S. Office Action issued U.S. Appl. No. 15/522,585.
Feb. 4, 2019 Notice of Allowance issued in U.S. Appl. No. 15/138,711.
Jan. 22, 2019 Office Action issued in Chinese Application No. 201480037465.2.

\* cited by examiner

Fig.6

| Focal distance \ Imaging distance | D1 | D2 | D3 | D4 | D5 | D6 | D7 | D8 | D9 |
|---|---|---|---|---|---|---|---|---|---|
| f1 | K11 | K12 | K13 | K14 | K15 | K16 | K17 | K18 | K19 |
| f2 | K21 | K22 | K23 | K24 | K25 | K26 | K27 | K28 | K29 |
| f3 | K31 | K32 | K33 | K34 | K35 | K36 | K37 | K38 | K39 |
| f4 | K41 | K42 | K43 | K44 | K45 | K46 | K47 | K48 | K49 |
| f5 | K51 | K52 | K53 | K54 | K55 | K56 | K57 | K58 | K59 |
| f6 | K61 | K62 | K63 | K64 | K65 | K66 | K67 | K68 | K69 |
| f7 | K71 | K72 | K73 | K74 | K75 | K76 | K77 | K78 | K79 |
| f8 | K81 | K82 | K83 | K84 | K85 | K86 | K87 | K88 | K89 |
| f9 | K91 | K92 | K93 | K94 | K95 | K96 | K97 | K98 | K99 |

Fig.17

| Focal distance | Maximum image plane movement coefficient $K_{max}$ |
|---|---|
| f1 | K11 |
| f2 | K21 |
| f3 | K31 |
| f4 | K41 |
| f5 | K52 |
| f6 | K62 |
| f7 | K72 |
| f8 | K82 |
| f9 | K91 |

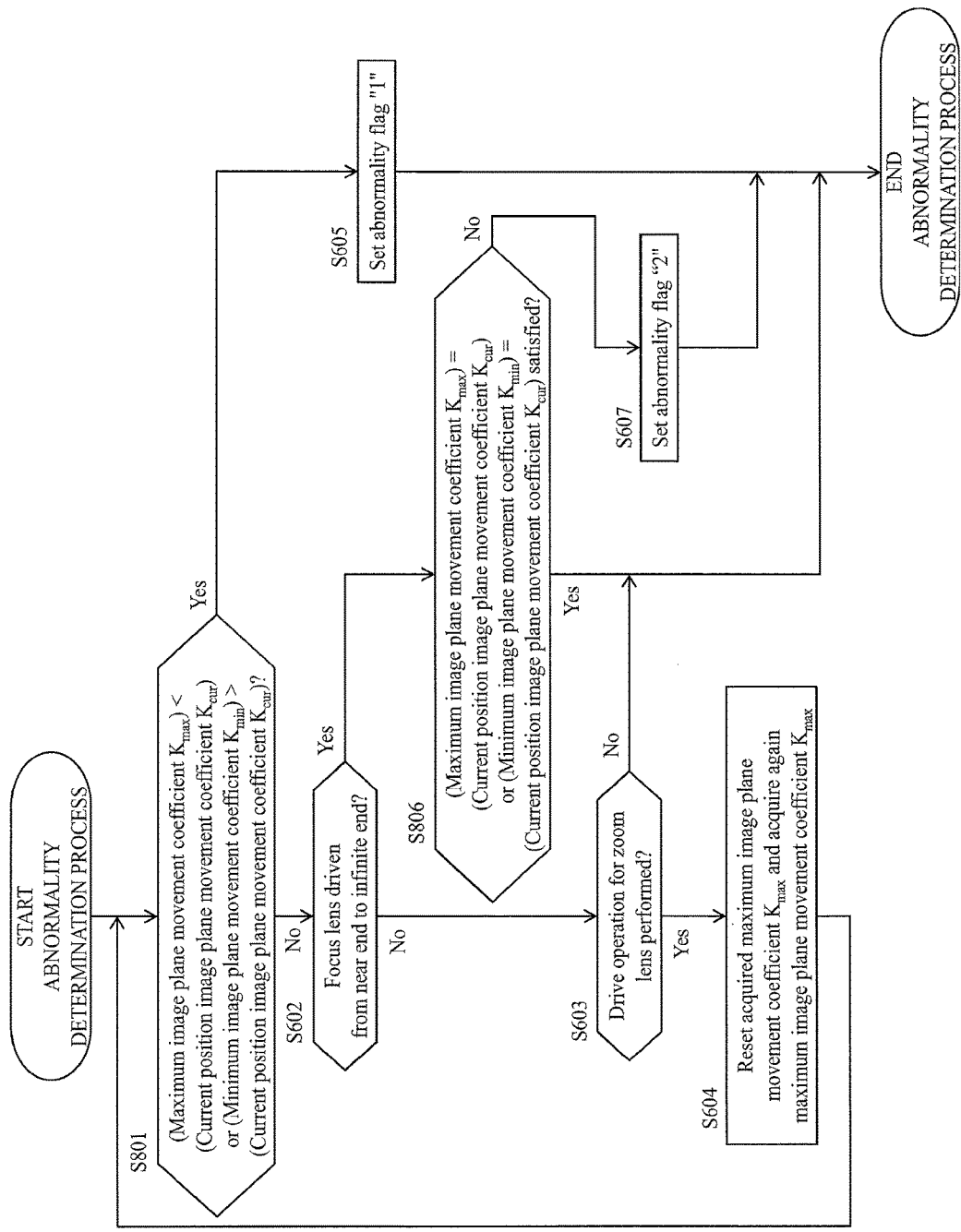

FOCUS ADJUSTMENT APPARATUS, IMAGING APPARATUS AND LENS BARREL

The present application is a divisional application of application Ser. No. 14/267,348 filed May 1, 2014, which in turn is a continuation of International Application No. PCT/JP2012/079189 filed Nov. 9, 2012, which claims the benefit of Japanese Application No. 2011-247090 filed Nov. 11, 2011. The disclosure of each of the prior applications is incorporated by reference herein in its entirety.

BACKGROUND OF THE INVENTION

1. Field of the Invention

The present invention relates to a focus adjustment apparatus, an imaging apparatus and a lens barrel.

2. Description of the Related Art

A technique is heretofore known which calculates an evaluation value with regard to the contrast via an optical system while driving a focus adjustment lens at a predetermined drive speed in the optical axis direction, thereby to detect a focal state of the optical system (refer to Patent Literature 1: JP2010-139666A, for example).

Patent Literature 1: JP2010-139666A

SUMMARY OF THE INVENTION

Objects of the present invention include providing a focus adjustment apparatus which can appropriately detect a focus adjustment state of an optical system.

The present invention provides the following means to achieve the above objects.

A focus adjustment control apparatus in embodiments is characterized by comprising: a focus detection unit that calculates an evaluation value with regard to contrast of an image via an optical system to detect a focus adjustment state of the optical system; an acquisition unit that acquires from a lens barrel at least one of a maximum value and a minimum value of an image plane movement coefficient that represents correspondence relationship between a movement amount of a focus adjustment lens included in the optical system and a movement amount of an image plane; and a control unit that uses at least one of the maximum value and the minimum value of the image plane movement coefficient to determine a drive speed for the focus adjustment lens when the focus detection unit detects the focus adjustment state.

The focus adjustment control apparatus is, in the above focus adjustment control apparatus, further characterized in that when the movement amount in an optical axis direction of the focus adjustment lens is $T_L$ and the movement amount of the image plane is $T_I$, the image plane movement coefficient is a coefficient that corresponds to a ratio defined by $T_L$ and $T_I$ and is determined depending on a lens position of the focus adjustment lens.

The focus adjustment control apparatus is, in the above focus adjustment control apparatus, further characterized in that when the image plane movement coefficient is a coefficient that corresponds to $T_I/T_L$, the control unit uses the maximum value of the image plane movement coefficient to determine the drive speed which is a speed that allows the focus detection unit to detect the focus adjustment state even if the focus adjustment lens moves to a position at which the image plane movement coefficient is the maximum value of the image plane movement coefficient, or when the image plane movement coefficient is a coefficient that corresponds to $T_L/T_I$, the control unit uses the minimum value of the image plane movement coefficient to determine the drive speed which is a speed that allows the focus detection unit to detect the focus adjustment state even if the focus adjustment lens moves to a position at which the image plane movement coefficient is the minimum value of the image plane movement coefficient.

A focus adjustment control apparatus in another embodiment is characterized by comprising: a focus detection unit that calculates an evaluation value with regard to contrast of an image via an optical system to detect a focus adjustment state of the optical system; an acquisition unit that acquires from a lens barrel an image plane movement coefficient that represents correspondence relationship between a movement amount of a focus adjustment lens included in the optical system and a movement amount of an image plane, and information regarding a play amount of the optical system; a control unit that performs scan control for scanning by the focus adjustment lens when the focus detection unit detects the focus adjustment state and performs, after the focus detection unit detects a focused position, focusing drive control for moving the focus adjustment lens to the focused position; and a control unit that uses the image plane movement coefficient and the play amount to determine whether or not to perform reducing play in the focusing drive control.

The focus adjustment control apparatus is, in the above focus adjustment control apparatus, further characterized in that the control unit uses the image plane movement coefficient and the play amount to calculate an image plane movement amount corresponding to the play amount and compares the calculated image plane movement amount corresponding to the play amount with a focal depth of an image via the optical system to determine whether or not to perform reducing play in the focusing drive control.

The focus adjustment control apparatus is, in the above focus adjustment control apparatus, further characterized in that the control unit uses the image plane movement coefficient and the play amount to determine whether or not to perform reducing play in the focusing drive control, the image plane movement coefficient corresponding to a lens position of the focus adjustment lens when the focus adjustment lens is reversely driven to the focused position after the focused position is detected.

The focus adjustment control apparatus is, in the above focus adjustment control apparatus, further characterized in that when the movement amount in an optical axis direction of the focus adjustment lens is $T_L$ and the movement amount of the image plane is $T_I$, the image plane movement coefficient is a coefficient that corresponds to a ratio defined by $T_L$ and $T_I$, and when the image plane movement coefficient is a coefficient that corresponds to $T_I/T_L$, the control unit uses a maximum value of the image plane movement coefficient and the play amount to determine whether or not to perform reducing play in the focusing drive control, or when the image plane movement coefficient is a coefficient that corresponds to $T_L/T_I$, the control unit uses a minimum value of the image plane movement coefficient and the play amount to determine whether or not to perform reducing play in the focusing drive control.

The focus adjustment control apparatus is, in the above focus adjustment control apparatus, further characterized in that the control unit uses the image plane movement coefficient and the play amount to determine whether or not to perform reducing play in the focusing drive control, the image plane movement coefficient corresponding to a lens position of the focus adjustment lens in the vicinity of the focused position of the focus adjustment lens.

An imaging apparatus comprises any of the focus adjustment control apparatuses discussed above.

A lens barrel is characterized by comprising: an optical system that includes a focus adjustment lens; a drive unit that drives the focus adjustment lens in an optical axis direction; a transceiver unit that performs transmission and reception of a signal between the lens barrel and a camera body; and a control unit that, when receiving a predetermined signal from a camera body via the transceiver unit, transmits to the camera body via the transceiver unit at least one of a maximum value and a minimum value of an image plane movement coefficient that represents correspondence relationship between a movement amount of the focus adjustment lens and a movement amount of an image plane.

The above lens barrel in embodiments is characterized by further comprising a storage unit that stores at least one of the maximum value and the minimum value of the image plane movement coefficient.

The above lens barrel is in embodiments characterized in that the image plane movement coefficient corresponds to a ratio defined by the movement amount in the optical axis direction of the focus adjustment lens and the movement amount of the image plane on the optical axis.

A lens barrel in another embodiment is characterized by comprising: an optical system that includes a focus adjustment lens; a drive unit that drives the focus adjustment lens in an optical axis direction; a transceiver unit that performs transmission and reception of a signal between the lens barrel and a camera body; and a control unit that controls the transceiver unit so that the transceiver unit transmits, to a camera body, first information determined depending on a lens position of the focus adjustment lens, wherein the control unit, when receiving a predetermined signal from a camera body via the transceiver unit, transmits to the camera body via the transceiver unit at least one of a maximum value and a minimum value of the first information.

The above lens barrel is in embodiments characterized in that when a movement amount of the focus adjustment lens is $T_L$ and a movement amount of an image plane is $T_I$, the first information is a coefficient that corresponds to $T_L/T_I$ or a coefficient that corresponds to $T_I/T_L$.

A lens barrel in further embodiments is characterized by comprising: an optical system that includes a focus adjustment lens; a drive unit that drives the focus adjustment lens in an optical axis direction; a transceiver unit that performs transmission and reception of a signal between the lens barrel and a camera body; and a control unit that controls the transceiver unit so that the transceiver unit transmits to a camera body a first image plane movement coefficient determined depending on a lens position of the focus adjustment lens, wherein the control unit, when receiving a predetermined signal from a camera body via the transceiver unit, transmits to the camera body via the transceiver unit a second image plane movement coefficient that does not depend on the lens position of the focus adjustment lens.

The above lens barrel is in embodiments characterized in that the second image plane movement coefficient is at least one of a maximum value and a minimum value of the first image plane movement coefficient.

The above lens barrel is in embodiments characterized by further comprising a zoom lens drive unit that drives a zoom lens in the optical axis direction, wherein when a focal distance of the zoom lens does not vary, the second image plane movement coefficient does not vary even if the lens position of the focus adjustment lens varies, but when the focal distance of the zoom lens varies, the second image plane movement coefficient varies.

A camera body is characterized by comprising: a focus detection unit that calculates an evaluation value with regard to contrast of an image via an optical system to detect a focus adjustment state of the optical system; a transceiver unit that performs transmission and reception of a signal between the camera body and a lens barrel; and a control unit that uses the signal received via the transceiver unit to perform drive control for a focus adjustment lens included in the optical system, wherein the control unit controls the transceiver unit so that the transceiver unit transmits to a lens barrel a first request signal that requests a first image plane movement coefficient determined depending on a lens position of the focus adjustment lens and a second request signal that requests a second image plane movement coefficient determined not depending on the lens position of the focus adjustment lens, and receives the first image plane movement coefficient and the second image plane movement coefficient from the lens barrel.

The above camera body is in embodiments characterized in that the second image plane movement coefficient is at least one of a maximum value and a minimum value of the first image plane movement coefficient.

The above camera body is in embodiments characterized in that when a movement amount in an optical axis direction of the focus adjustment lens is $T_L$ and a movement amount of an image plane is $T_I$, the image plane movement coefficient is a coefficient that corresponds to a ratio defined by $T_L$ and $T_I$, and the control unit performs a predetermined operation when the image plane movement coefficient is a coefficient that corresponds to $T_I/T_L$ and the first image plane movement coefficient corresponding to a current lens position of the focus adjustment lens is determined to be larger than the second image plane movement coefficient or when the image plane movement coefficient is a coefficient that corresponds to $T_L/T_I$ and the first image plane movement coefficient corresponding to a current lens position of the focus adjustment lens is determined to be smaller than the second image plane movement coefficient.

The above camera body is in embodiments characterized in that the control unit performs a predetermined operation when the first image plane movement coefficient equal to the second image plane movement coefficient is not detected as a result of acquiring the first image plane movement coefficient corresponding to a current lens position of the focus adjustment lens while driving the focus adjustment lens from one end to the other end in an optical axis direction.

The above camera body is in embodiments characterized in that the predetermined operation is at least one of control that performs search drive of the focus adjustment lens at a second speed lower than a first speed that is a search drive speed before the determination, control that prohibits notification to a photographer that a focused state is obtained, and control that prohibits the focus detection unit from detecting the focus adjustment state.

A camera system is characterized by comprising any of the above-discussed camera bodies.

According to the present invention, a focus adjustment state of an optical system can be appropriately detected.

BRIEF DESCRIPTION OF THE DRAWINGS

FIG. 4(B) is a front elevational view showing enlarged one of the focus detection pixels 222a;

FIG. 4(E) is a cross-sectional view showing enlarged one of the focus detection pixels 222a;

FIG. 6 depicts a table showing a relationship between a lens position of a zoom lens 32 (focal distance) and a lens position of a focus lens 33 (imaging distance), and an image plane movement coefficient K;

FIG. 17 depicts a table showing a relationship between the lens position of the zoom lens 32 (focal distance) and a maximum image plane movement coefficient $K_{max}$;

FIG. 19 is a flowchart showing an abnormality determination process according to the sixth embodiment.

DESCRIPTION OF THE PREFERRED EMBODIMENTS

Embodiments of the present invention will hereinafter be described with reference to the drawings.

First Embodiment

Figure 1:
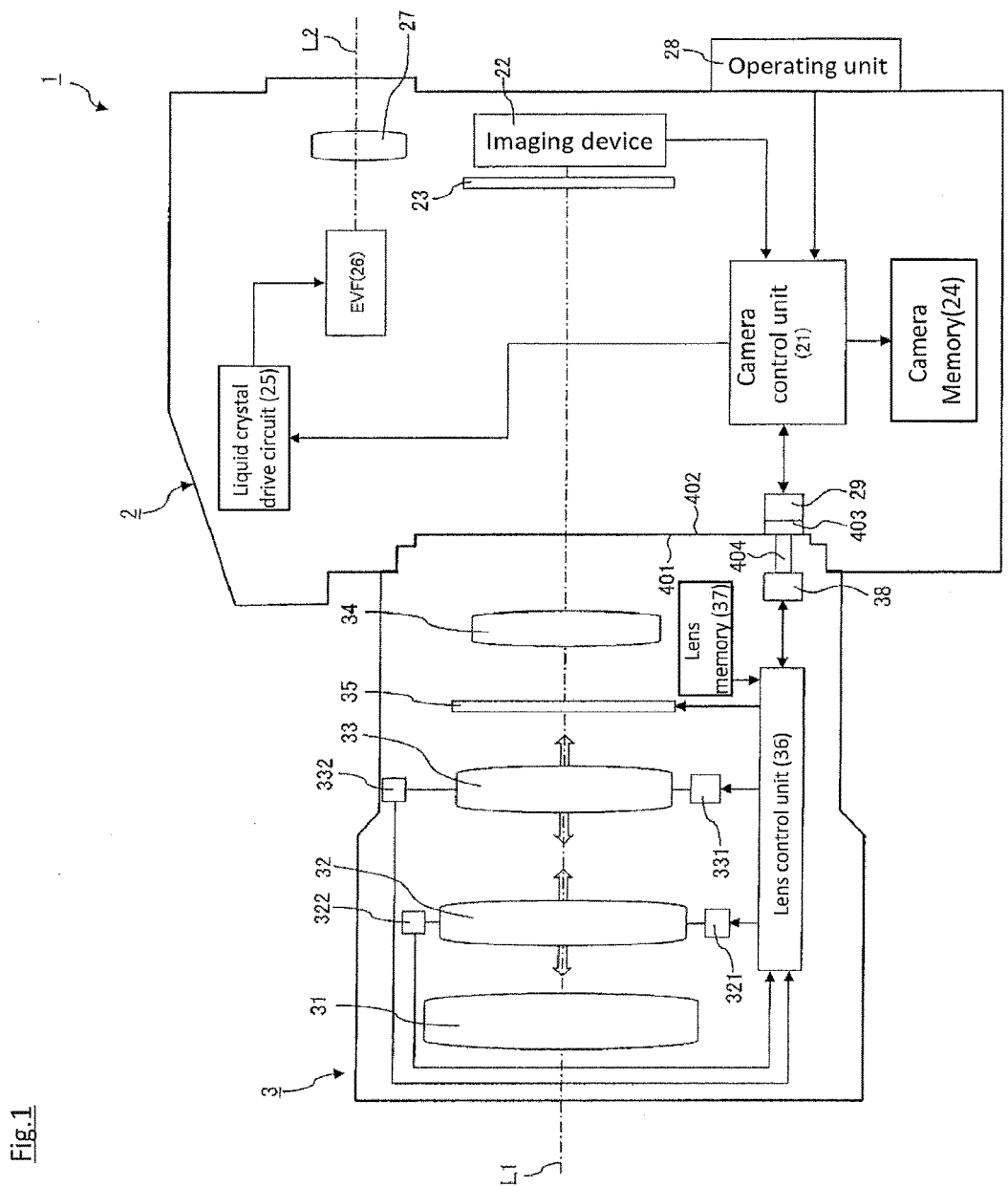
FIG. 1 is a block diagram showing a camera according to embodiments of the present invention.

FIG. 1 is a view of the principal configuration which shows a digital camera 1 according to the present embodiment. The digital camera 1 according to the present embodiment (referred simply to as "camera 1", hereinafter) is configured of a camera body 2 and a lens barrel 3, so that a mount unit 401 of the camera body 2 and a mount unit 402 of the lens barrel 3 are coupled with each other in a detachable manner.

The lens barrel 3 is an interchangeable lens which can be detachably attached to the camera body 2. As shown in FIG. 1, the lens barrel 3 is provided therein with an imaging optical system which includes lenses 31, 32, 33 and 34 and an aperture 35.

The lens 33 is a focus lens, which can be moved in the optical axis L1 direction thereby to allow the focal distance of the imaging optical system to be adjusted. The focus lens 33 is provided so as to be movable along the optical axis L1 of the lens barrel 3, and the position of the focus lens 33 may be adjusted by a focus lens drive motor 331 while being detected by an encoder 332 for the focus lens.

The specific configuration of the movement mechanism for the focus lens 33 along the optical axis L1 is not particularly limited. As one example, a rotating barrel is inserted in a rotatable manner inside a fixed barrel fixed to the lens barrel 3. The inner circumferential surface of this rotating barrel is formed with a helicoid groove (spiral groove). The end of a lens frame to which the focus lens 33 is fixed is engaged with the helicoid groove. The focus lens drive motor 331 is used to rotate the rotating barrel, so that the focus lens 33 fixed to the lens frame moves straight along the optical axis L1.

As described above, by rotating the rotating barrel with respect to the lens barrel 3, the focus lens 33 fixed to the lens frame moves straight in the optical axis L1 direction. The focus lens drive motor 331 as a drive source for the above movement is provided in the lens barrel 3. The focus lens drive motor 331 and the rotating barrel are, for example, coupled via a transmission comprising a plurality of gears. If the drive shaft of the focus lens drive motor 331 is driven to rotate to either direction, then this driving force will be transmitted to the rotating barrel by a predetermined gear ratio to drive it in either direction, thereby moving the focus lens 33 fixed to the lens frame straight in a certain direction along the optical axis L1. If, on the other hand, the drive shaft of the focus lens drive motor 331 is driven to rotate in the opposite direction, then the gears of the transmission also rotate in the opposite directions, and the focus lens 33 will move straight in the opposite direction along the optical axis L1.

The position of the focus lens 33 is detected by the encoder 332 for the focus lens. As already described, the position in the optical axis L1 direction of the focus lens 33 is correlated with the rotational angle of the rotating barrel, and can thus be determined by detecting the relative rotational angle of the rotating barrel with respect to the lens barrel 3, for example.

As the encoder 332 for the focus lens in the present embodiment, it is possible to use one which detects rotation of a rotary disk coupled with the rotational drive of the rotating barrel by a photo sensor such as a photo interrupter so as to output a pulse signal corresponding to the rotational speed, or one which brings an encoder pattern on the surface of a flexible printed circuit board provided at either one of the fixed barrel and the rotating barrel into contact with a brush contact which is provided at the other and detects the change in the contact position corresponding to the amount of movement of the rotating barrel (either in the rotational direction or optical axis direction) by a detection circuit, etc.

The focus lens 33 can be moved by rotation of the above-described rotating barrel from the end at the camera body side (referred also to as "near end") to the end at the object side (referred also to as "infinite end") in the optical axis L1 direction. The encoder 332 for the focus lens detects the current position of the focus lens 33 and outputs current position information. A lens control unit 36 performs control to transmit the current position information to a camera control unit 21. The camera control unit 21 uses the current position information to calculate a drive target position of the focus lens 33, a drive speed for the focus lens 33, or an image plane movement speed (referred hereinafter to as "drive information"). The camera control unit 21 performs control to transmit the drive information to the lens control unit 36. On the basis of the drive information, the lens control unit 36 performs drive control for the focus lens drive motor 331.

On the other hand, the lens 32 is a zoom lens, which can be moved in the optical axis L1 direction thereby to allow the imaging magnification of the imaging optical system to be adjusted. Like in the case of the above-described focus lens 33, the position of the zoom lens 32 may be adjusted by a zoom lens drive motor 321 while being detected by an encoder 322 for the zoom lens. The position of the zoom lens 32 can be adjusted by operating a zoom button provided on an operating unit 28 or by operating a zoom ring (not shown) provided on the lens barrel 3. The movement mechanism for the zoom lens 32 along the optical axis L1 may be the same as the above-described mechanism for the focus lens 33. The configurations of the encoder 322 for the zoom lens and the zoom lens drive motor 321 may also be the same as those of the encoder 332 for the focus lens and the focus lens drive motor 331.

The aperture 35 is configured such that the aperture size centered on the optical axis L1 can be adjusted in order to restrict the amount of light beams which pass through the above imaging optical system and reach an imaging device 22 and to adjust the amount of blurring. The size of the aperture 35 is adjusted by a suitable aperture size, which was calculated in the automatic exposure mode, being sent from the camera control unit 21 through the lens control unit 36, for example. This adjustment may also be performed by an aperture size, which was set in the manual operation using the operating unit 28 provided at the camera body 2, being input from the camera control unit 21 to the lens control unit 36. The aperture size of the aperture 35 is detected by an aperture sensor not shown, and the lens control unit 36 recognizes the current aperture size.

A lens memory 37 is provided to store an image plane movement coefficient K. The image plane movement coefficient K as used herein is a value that represents the correspondence relationship between the drive amount of the focus lens 33 and the movement amount of an image plane, and may be a ratio defined by the drive amount of the focus lens 33 and the movement amount of an image plane, for example. According to the present embodiment, the image plane movement coefficient can be obtained using Expression (1) below, for example, in which case as the image plane movement coefficient K increases, the movement amount of an image plane due to driving the focus lens 33 also increases.

(Image plane movement coefficient $K$)=(Movement amount of image plane)/(Drive amount of focus lens 33)    (1)

In the camera 1 according to the present embodiment, even if the drive amount of the focus lens 33 is the same, different lens position of the focus lens 33 gives a different movement amount of an image plane. In a similar way, even if the drive amount of the focus lens 33 is the same, different lens position of the zoom lens 32 gives a different movement amount of an image plane. That is, the image plane movement coefficient varies depending on the lens position in the optical axis of the focus lens 33 and further on the lens position in the optical axis of the zoom lens 32, and the lens control unit 36 according to the present embodiment therefore operates to store the image plane movement coefficient K for each lens position of the focus lens 33 and for each lens position of the zoom lens 32.

FIG. 6 depicts a table which is stored in the lens memory 37 and shows the relationship between the lens position of the zoom lens 32 (focal distance) and the lens position of the focus lens 33 (imaging distance), and the image plane movement coefficient K. The table depicted in FIG. 6 is configured such that the drive span of the zoom lens 32 is divided into nine segments of "f1" to "f9" in this order from the near end to the infinite end while the drive span of the focus lens 33 is also divided into nine segments of "D1" to "D9" in this order from the near end to the infinite end, thereby to store the image plane movement coefficient K corresponding to each lens position. For example, when the lens position of the zoom lens 32 (focal distance) is at "f1" and the lens position of the focus lens 33 (imaging distance) is at "D1", the image plane movement coefficient K is "K11". In the above example, the table depicted in FIG. 6 is configured such that the drive span of each lens is divided into nine segments, but the number of division is not particularly limited and may freely be set.

With reference to FIG. 6, a maximum image plane movement coefficient $K_{max}$ and a minimum image plane movement coefficient $K_{min}$ will then be described.

The maximum image plane movement coefficient $K_{max}$ as used herein is a value that corresponds to the maximum value of the image plane movement coefficient K. It is preferred that the maximum image plane movement coefficient $K_{max}$ varies depending on the current lens position of the zoom lens 32. It is also preferred that, when the current lens position of the zoom lens 32 does not vary, the maximum image plane movement coefficient $K_{max}$ is a constant value (fixed value) even if the current lens position of the focus lens 33 varies. It is thus preferred that the maximum image plane movement coefficient $K_{max}$ is a fixed value (constant value) that is determined depending on the lens position of the zoom lens 32 (focal distance) and that does not depend on the lens position of the focus lens 33 (imaging distance).

For example, in FIG. 6, each of "K11", "K21", "K31", "K41", "K52", "K62", "K72", "K82" and "K91" in gray cells is the maximum image plane movement coefficient $K_{max}$ that represents a maximum value among the image plane movement coefficients K at each lens position of the zoom lens 32 (focal distances). More specifically, provided that the lens position of the zoom lens 32 (focal distance) is at "f1", "K11" as the image plane movement coefficient K when the lens position of the focus lens 33 (imaging distance) is at "D1" among "D1" to "D9" is the maximum image plane movement coefficient $K_{max}$ that represents a maximum value. Therefore, "K11" as the image plane movement coefficient K when the lens position of the focus lens 33 (imaging distance) is at "D1" represents a maximum value among "K11" to "K19" which are the image plane movement coefficients K when respective lens positions (imaging distances) are at "D1" to "D9". In a similar way, provided that the lens position of the zoom lens 32 (focal distance) is at "f2", "K21" as the image plane movement coefficient K when the lens position of the focus lens 33 (imaging distance) is at "D1" also represents a maximum value among "K21" to "K29" which are the image plane movement coefficients K when respective lens positions (imaging distances) are at "D1" to "D9". That is, "K21" is the maximum image plane movement coefficient $K_{max}$. The same applies to the case where the lens position of the zoom lens 32 (focal distance) is at each of "f3" to "f9", in which case each of "K31", "K41", "K52", "K62", "K72", "K82" and "K91" in gray cells is the maximum image plane movement coefficient $K_{max}$.

In a similar way, the minimum image plane movement coefficient $K_{min}$ as used herein is a value that corresponds to the minimum value of the image plane movement coefficient K. It is preferred that the minimum image plane movement coefficient $K_{min}$ varies depending on the current lens position of the zoom lens 32. It is also preferred that, when the current lens position of the zoom lens 32 does not vary, the minimum image plane movement coefficient $K_{min}$ is a constant value (fixed value) even if the current lens position of the focus lens 33 varies. For example, in FIG. 6, each of "K19", "K29", "K39", "K49", "K59", "K69", "K79", "K89" and "K99" in hatched cells is the minimum image plane movement coefficient $K_{min}$ that represents a minimum value among the image plane movement coefficients K at each lens position of the zoom lens 32 (focal distances).

In such a manner, as shown in FIG. 6, the lens memory 37 stores: the image plane movement coefficients K that correspond to respective lens positions of the zoom lens 32 (focal distances) and respective lens positions of the focus lens 33 (imaging distances); the maximum image plane movement coefficient $K_{max}$ that represents a maximum value among the image plane movement coefficients K for each lens position of the zoom lens 32 (focal distance); and the minimum image plane movement coefficient $K_{min}$ that represents a minimum value among the image plane movement coefficients K for each lens position of the zoom lens 32 (focal distance).

Electrical contacts 403 provided at the mount unit 401 of the camera body 2 and electrical contacts 404 provided at the mount unit 402 of the lens barrel 3 are connected with one another thereby to electrically connect the lens control unit 36 with the camera control unit 21 via a lens transceiver unit 38 and a camera transceiver unit 29.

According to the present embodiment, the camera control unit 21 and the lens control unit 36 perform stationary communication therebetween and also perform non-stationary communication as will be described later. In the stationary communication, the camera control unit 21 transmits repeatedly at a predetermined interval (e.g. interval of tens milliseconds to hundreds milliseconds) a first request signal that requests lens information to the lens control unit 36 via the camera transceiver unit 29 and the lens transceiver unit 38. After being initiated, the stationary communication may preferably be continued at the predetermined interval until the power is turned off.

In addition, the camera control unit 21 transmits commands, such as for driving the zoom lens 32, driving the focus lens 33 and adjusting the aperture size of the aperture 35, to the lens control unit 36.

The lens control unit 36, in the stationary communication, receives commands such as for adjusting the aperture size and performs control on the basis of the received commands. The lens control unit 36, when receiving the first request signal in the stationary communication, transmits repeatedly the lens information to the camera control unit 21. Examples of the lens information as used herein include information with regard to the position of the zoom lens 32, the position of the focus lens 33 and the aperture size of the aperture 35, etc. and a current position image plane movement coefficient $K_{cur}$. The current position image plane movement coefficient $K_{cur}$ as used herein is an image plane movement coefficient K that corresponds to the current position of the zoom lens (focal distance) and the current position of the focus lens (imaging distance).

According to the present embodiment, the lens control unit 36 refers to the table which is stored in the lens memory 37 and represents the relationship between the lens positions (position of zoom lens and position of focus lens) and the image plane movement coefficient K, thereby to obtain the current position image plane movement coefficient $K_{cur}$ which corresponds to the current lens position of the zoom lens 32 and the current lens position of the focus lens 33.

In the non-stationary communication which is different from the above stationary communication, the camera control unit 21 transmits a second request signal for requesting transmission of the maximum image plane movement coefficient $K_{max}$ and the minimum image plane movement coefficient $K_{min}$. It is preferred that the above non-stationary communication is interruptible communication to the stationary communication. The lens control unit 36, when receiving the second request signal in the non-stationary communication, transmits the maximum image plane movement coefficient $K_{max}$ and the minimum image plane movement coefficient $K_{min}$ to the camera control unit 21.

The maximum image plane movement coefficient $K_{max}$ is transmitted when the second request signal is received in the non-stationary communication, and differs from the current position image plane movement coefficient $K_{cur}$ which is transmitted when the first request signal is received in the stationary communication.

Referring to FIG. 6, provided that the lens position of the zoom lens 32 (focus distance) is at "f1" and the lens position of the focus lens 33 (imaging distance) is at "D4", for example, the lens control unit 36 transmits "K14" as the current position image plane movement coefficient $K_{cur}$ to the camera control unit 21 when receiving the first request signal from the camera control unit 21 in the stationary communication, and transmits "K11" as the maximum image plane movement coefficient $K_{max}$ and "K19" as the minimum image plane movement coefficient $K_{min}$ to the camera control unit 21 when receiving the second request signal from the camera control unit 21 in the non-stationary communication.

On the other hand, in the camera body 2, the imaging device 22 which receives light beams L1 from the above imaging optical system is provided at a predetermined focal plane of the imaging optical system. At the front of the same, a shutter 23 is provided. The imaging device 22 is configured of a device, such as CCD and CMOS, which converts the received optical signal to an electrical signal to send it to the camera control unit 21. Captured image information sent to the camera control unit 21 is sequentially sent to a liquid crystal drive circuit 25 and is displayed on an electronic viewfinder (EVF) 26 of a viewing optical system. When a release button (not shown) provided at the operating unit 28 is fully pressed, the captured image information is recorded in the recording medium, that is, a camera memory 24. The camera memory 24 can be any of a detachable card type memory or built-in type memory. Details of the structure of the imaging device 22 will be described later.

The viewing optical system is provided in the camera body 2, for viewing the image captured by the imaging device 22. The viewing optical system in the present embodiment comprises: the electronic viewfinder (EVF) 26 comprising a liquid crystal display element; the liquid crystal drive circuit 25 which drives the electronic viewfinder 26; and an ocular lens 27. The liquid crystal drive circuit 25 reads captured image information which was captured by the imaging device 22 and was sent to the camera control unit 21, and uses this as the basis to drive the electronic viewfinder 26. This allows the photographer to view the currently captured image through the ocular lens 27. Instead of the above viewing optical system using the optical axis L2 or in addition to this, it is also possible to provide a liquid crystal display at the back surface of the camera body 2, etc. and display the captured image on this liquid crystal display.

The camera control unit 21 is provided in the camera body 2. The camera control unit 21, which is electrically connected with the lens control unit 36 via the lens transceiver unit 38 and the camera transceiver unit 29, transmits the first request signal in the stationary communication to the lens control unit 36 at an interval of tens milliseconds to hundreds milliseconds as described above, and receives the lens information such as the current position image plane movement coefficient $K_{cur}$. In addition, the camera control unit 21 transmits commands for performing adjustment of the aperture value, etc. to the lens control unit 36.

Further, the camera control unit 21, as described above, reads the pixel output from the imaging device 22, and processes the read pixel output as necessary by a predetermined information process to generate image information, which is output to the liquid crystal drive circuit 25 of the electronic viewfinder 26 and/or memory 24. In addition, the camera control unit 21 controls the camera 1 as a whole, such as correction of the image information from the imaging device 22 and detection of the state of focus adjustment of the lens barrel 3 and state of aperture adjustment, etc.

Further, the camera control unit 21, in addition to the above, uses the pixel data read from the imaging device 22 as the basis for detection of a focus adjustment state of the imaging optical system by a phase difference detection system and detection of a focus adjustment state of the imaging optical system by a contrast detection system. The specific method of detection of the focus adjustment state will be described later.

The operating unit 28 includes the shutter release button and input switches, such as a motion picture imaging start switch, for the photographer to set various operating modes of the camera 1, and is designed to enable switching of the auto focus mode/manual focus mode and switching of the still picture imaging mode/motion picture imaging mode. The various modes set via the operating unit 28 are sent to the camera control unit 21, which controls the operation of the camera 1 as a whole. The shutter release button includes a first switch SW1 which is turned on by half pressing of the button and a second switch SW2 which is turned on by full pressing of the button.

The imaging device 22 according to the present embodiment will now be explained.

Figure 2:
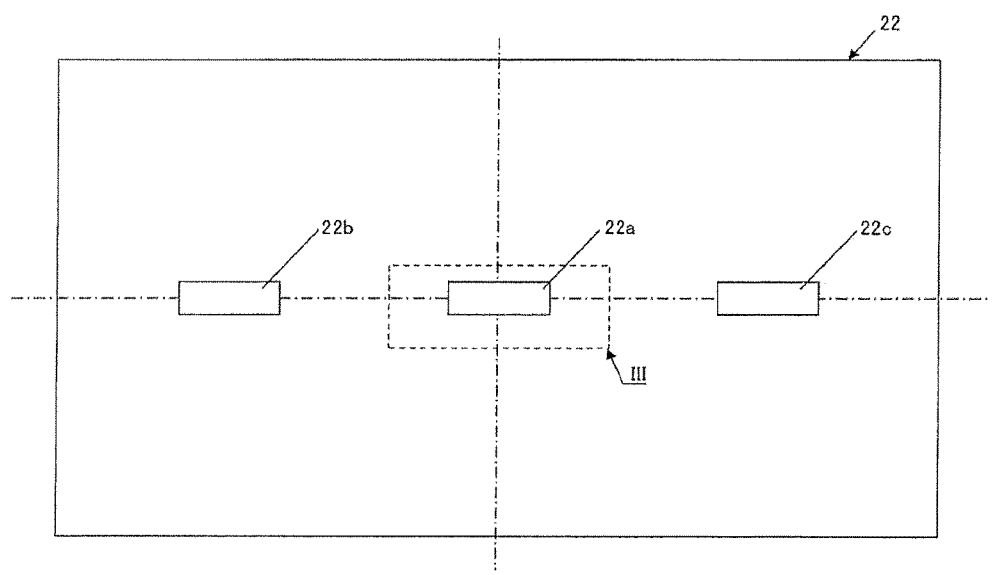
FIG. 2 is a front elevational view showing an imaging plane of an imaging device shown in FIG. 1.
Figure 3:
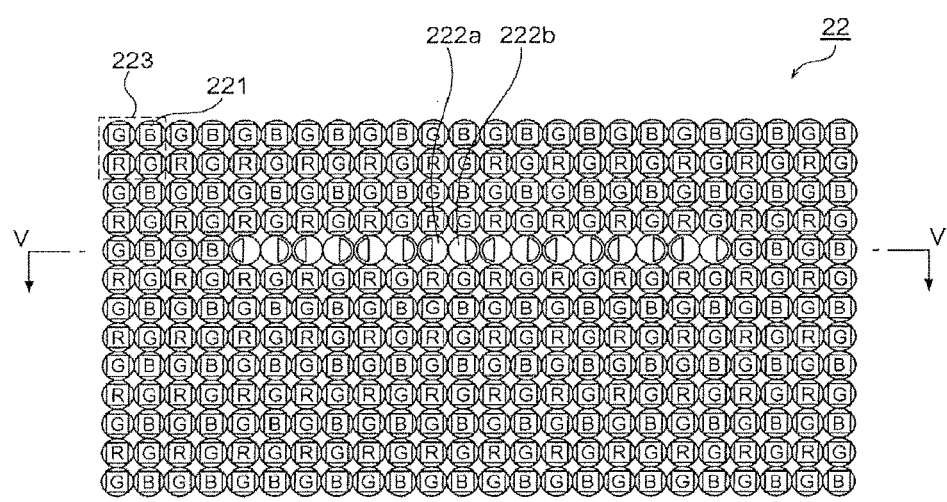
FIG. 3 is a front elevational view which enlarges part III of FIG. 2 to schematically show an arrangement of focus detection pixels 222a and 222b.

FIG. 2 is a front elevational view which shows an imaging plane of the imaging device 22, and FIG. 3 is a front elevational view which enlarges area III of FIG. 2 to schematically show the arrangement of focus detection pixels 222a and 222b.

The imaging device 22 of the present embodiment, as shown in FIG. 3, is configured such that a plurality of imaging pixels 221 are arranged two-dimensionally on the plane of the imaging plane, i.e., green pixels G having color filters which pass the wavelength region of the green color, red pixels R having color filters which pass the wavelength region of the red color, and blue pixels B having color filters which pass the wavelength region of the blue color, are arranged on a so-called "Bayer arrangement". That is, in each group 223 of four adjoining pixels (closely packed square lattice array), two green pixels are arranged on one diagonal, while one red pixel and one blue pixel are arranged on the other diagonal. By using such groups 223 of pixels arranged in a Bayer arrangement as units and arranging such groups 223 of pixels on the imaging plane of the imaging device 22 repeatedly two-dimensionally, the imaging device 22 is configured.

The array in the unit pixel group 223 may also be a closely packed hexagonal lattice array instead of the illustrated closely packed square lattice, for example. The configuration and array of the color filters are not limited to the above. It is also possible to employ an array of complementary color filters (green: G, yellow: Ye, magenta: Mg, and cyan: Cy).

Figure 4A:
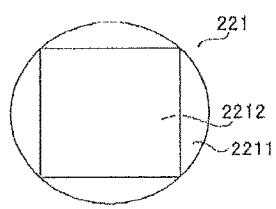
FIG. 4(A) is a front elevational view showing enlarged one of imaging pixels 221.
Figure 4D:
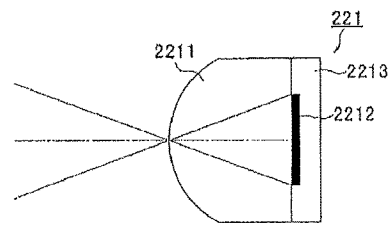
FIG. 4(D) is a cross-sectional view showing enlarged one of the imaging pixels 221.

FIG. 4(A) is a front elevational view which shows one of the imaging pixels 221 enlarged, while FIG. 4(D) is a cross-sectional view of the same. One imaging pixel 221 is configured of a microlens 2211, a photoelectric conversion unit 2212, and a not shown color filter. As shown in the cross-sectional view of FIG. 4(D), the photoelectric conversion unit 2212 is built into the surface of a semiconductor circuit board 2213 of the imaging device 22, while the microlens 2211 is formed on the surface of that. The photoelectric conversion unit 2212 is shaped to use the microlens 2211 to receive the imaging light beams passing through an exit pupil (for example, F1.0) of the imaging optical system, and thereby receives the imaging light beams.

In addition, at the center of the imaging plane of the imaging device 22 and at the left and right symmetric positions from the center, that is, at three locations, focus detection pixel strings 22a, 22b and 22c are provided, at each of which focus detection pixels 222a and 222b are arranged as substitute for the above-described imaging pixels 221. As shown in FIG. 3, one focus detection pixel string is configured such that a plurality of focus detection pixels 222a and 222b are arranged adjoining each other alternately in a horizontal string (22a, 22b, 22c). In the present embodiment, the focus detection pixels 222a and 222b are densely arranged without gap at the positions of the green pixels G and blue pixels B of the imaging pixels 221 arranged in a Bayer arrangement.

The positions of the focus detection pixel strings 22a to 22c shown in FIG. 2 are not limited to the illustrated positions. Strings may be arranged at any single location or two locations, or four or more locations. Further, during actual focus detection, the photographer can also manually operate the operating unit 28 to select a desired focus detection pixel string as the focus detection area from among the plurality of arranged focus detection pixel strings 22a to 22c.

Figure 4B:
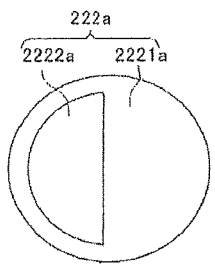
Figure 4E:
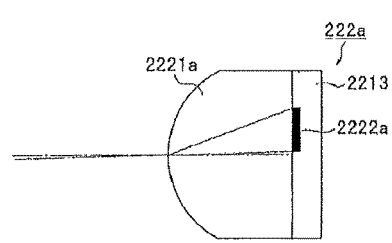
Figure 4C:
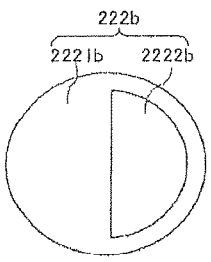
FIG. 4(C) is a front elevational view showing enlarged one of the focus detection pixels 222b.
Figure 4F:
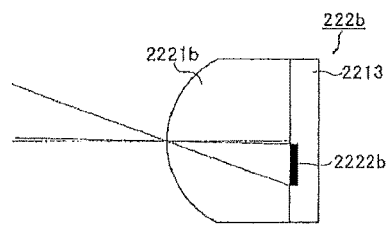
FIG. 4(F) is a cross-sectional view showing enlarged one of the focus detection pixels 222b.

FIG. 4(B) is a front elevational view which shows one of the focus detection pixels 222a enlarged, while FIG. 4(E) is a cross-sectional view of the focus detection pixel 222a. FIG. 4(C) is a front elevational view which shows one of the focus detection pixels 222b enlarged, while FIG. 4(F) is a cross-sectional view of the focus detection pixel 222b. The focus detection pixel 222a, as shown in FIG. 4(B), is configured of a microlens 2221a and a semicircular shaped photoelectric conversion unit 2222a. As shown in the cross-sectional view of FIG. 4(E), the photoelectric conversion unit 2222a is built into the surface of a semiconductor circuit board 2213 of the imaging device 22, while the microlens 2221a is formed on the surface of that. The focus detection pixel 222b, as shown in FIG. 4(C), is configured of a microlens 2221b and a photoelectric conversion unit 2222b. As shown in the cross-sectional view of FIG. 4(F), the photoelectric conversion unit 2222b is built into the surface of a semiconductor circuit board 2213 of the imaging device 22, while the microlens 2221b is formed on the surface of that. These focus detection pixels 222a and 222b, as shown in FIG. 3, are arranged mutually adjoining each other in a horizontal string to thereby form the focus detection pixel strings 22a to 22c shown in FIG. 2.

The photoelectric conversion units 2222a and 2222b of the focus detection pixels 222a and 222b are shaped to use the microlenses 2221a and 2221b to receive the light beams passing through a predetermined region (for example, F2.8) of the exit pupil of the imaging optical system. The focus detection pixels 222a and 222b are not provided with color filters, so that their spectral characteristics are combinations of the spectral characteristics of the photodiodes which perform the photoelectric conversion and the spectral characteristics of infrared cut filters not shown. Note, however, that each pixel may also be configured to comprise one of the same color filters as those of the imaging pixels 221, for example, the green filter.

The photoelectric conversion units 2222a and 2222b of the focus detection pixels 222a and 222b shown in FIG. 4(B) and FIG. 4(C) are made semicircular shapes, but the shapes of the photoelectric conversion units 2222a and 2222b are not limited to this. Other shapes, for example, oval shapes, rectangular shapes and polygonal shapes can also be used.

The description will now be directed to the so-called "phase difference detection system" which detects the focus adjustment state of the imaging optical system on the basis of the pixel outputs of the above-described focus detection pixels 222a and 222b.

Figure 5:
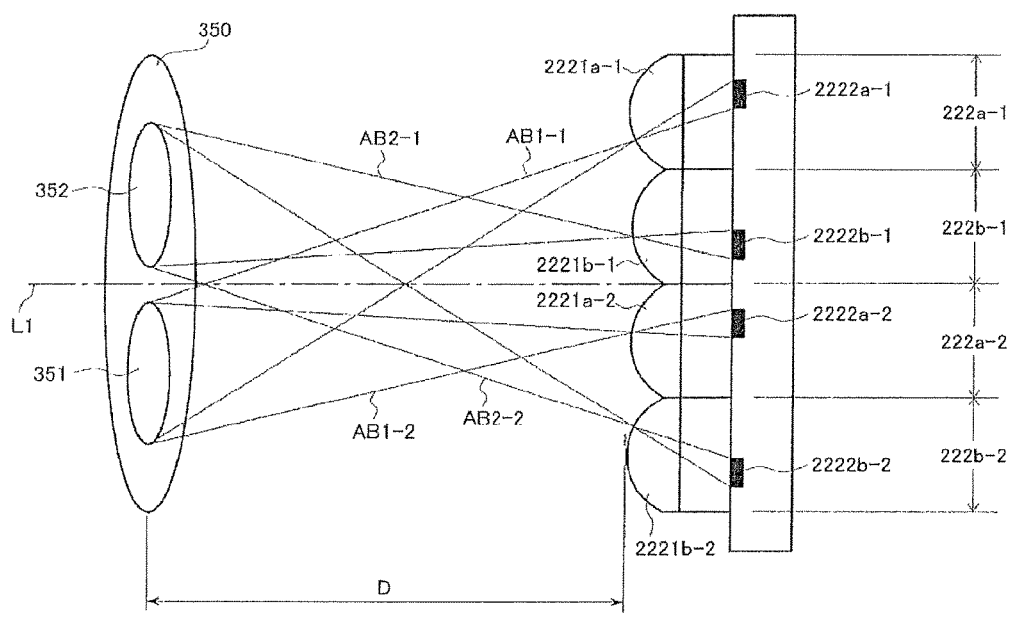
FIG. 5 is a cross-sectional view along line V-V of FIG. 3.

FIG. 5 is a cross-sectional view along line V-V of FIG. 3, and shows that the focus detection pixels 222a-1, 222b-1, 222a-2 and 222b-2 arranged near the imaging optical axis L1 and adjoining one another receive the light beams AB1-1, AB2-1, AB1-2 and AB2-2, respectively, which are emitted from the distance measuring pupils 351 and 352 of the exit pupil 350. In FIG. 5, among the plurality of focus detection pixels 222a and 222b, only those positioned near the imaging optical axis L are shown as examples, but the other focus detection pixels other than those shown in FIG. 5 are similarly configured to receive respective light beams emitted from the pair of distance measuring pupils 351 and 352.

The "exit pupil 350" as used herein is an image which is set at the position of the distance D in front of the microlenses 2221a and 2221b of the focus detection pixels 222a and 222b arranged at the predetermined focus plane of the imaging optical system. The distance D is the value unambiguously determined in accordance with the curvature and the refractive index of the microlens and the distance between the microlens and the photoelectric conversion unit, etc. This distance D is referred to as the "distance measuring pupil distance". The "distance measuring pupils 351 and 352" as used herein are images of the photoelectric conversion units 2222a and 2222b which are projected respectively by the microlenses 2221a and 2221b of the focus detection pixels 222a and 222b.

In FIG. 5, the direction of arrangement of the focus detection pixels 222a-1, 222b-1, 222a-2 and 222b-2 matches the direction of arrangement of the pair of distance measuring pupils 351 and 352.

As shown in FIG. 5, the microlenses 2221a-1, 2221b-1, 2221a-2 and 2221b-2 of the focus detection pixels 222a-1, 222b-1, 222a-2 and 222b-2 are arranged near the predetermined focal plane of the imaging optical system. When the shapes of the photoelectric conversion units 2222a-1, 2222b-1, 2222a-2 and 2222b-2 arranged behind the microlenses 2221a-1, 2221b-1, 2221a-2 and 2221b-2 are projected on the exit pupil 350 which is separated from the microlenses 2221a-1, 2221b-1, 2221a-2 and 2221b-2 by exactly the distance measurement distance D, the projected shapes form the distance measuring pupils 351 and 352.

In other words, the relative positional relationships of the microlenses and the photoelectric conversion units in the focus detection pixels are set so that the projected shapes (distance measuring pupils 351 and 352) of the photoelectric conversion units of the focus detection pixels match on the exit pupil 350 at the distance measurement distance D, and the directions of projection of the photoelectric conversion units in the focus detection pixels are thus determined.

As shown in FIG. 5, the photoelectric conversion unit 2222a-1 of the focus detection pixel 222a-1 outputs a signal corresponding to the intensity of an image formed on the microlens 2221a-1 by the light beam AB1-1 which passes through the distance measuring pupil 351 and heads toward the microlens 2221a-1. Similarly, the photoelectric conversion unit 2222a-2 of the focus detection pixel 222a-2 outputs a signal corresponding to the intensity of an image formed on the microlens 2221a-2 by the light beam AB1-2 which passes through the distance measuring pupil 351 and heads toward the microlens 2221a-2.

The photoelectric conversion unit 2222b-1 of the focus detection pixel 222b-1 outputs a signal corresponding to the intensity of an image formed on the microlens 2221b-1 by the light beam AB2-1 which passes through the distance measuring pupil 352 and heads toward the microlens 2221b-1. Similarly, the photoelectric conversion unit 2222b-2 of the focus detection pixel 222b-2 outputs a signal corresponding to the intensity of an image formed on the microlens 2221b-2 by the light beam AB2-2 which passes through the distance measuring pupil 352 and heads toward the microlens 2221b-2.

By arranging the above-described two types of plural focus detection pixels 222a and 222b in a straight line as shown in FIG. 3 and grouping the outputs of the photoelectric conversion units 2222a and 2222b of the focus detection pixels 222a and 222b into respective output groups corresponding to the distance measuring pupils 351 and 352, data is obtained relating to the intensity distributions of the pair of images which the focus detection beams passing through the distance measuring pupils 351 and 352 form on the focus detection pixel strings. This intensity distribution data can be processed by image deviation detection operation, such as correlation operation or phase difference detection, thereby to detect an image deviation amount by the so-called phase difference detection system.

Further, by processing the obtained image deviation amount using conversion operation depending on the interval between the centers of gravity of the pair of distance measuring pupils, it is possible to find the deviation of the current focal plane with respect to the predetermined focal plane (focal plane at focus detection area corresponding to position of microlens array on predetermined focal plane), that is, the defocus amount.

The calculation of the image deviation amount using the phase difference detection system and the calculation of the defocus amount based thereon are performed by the camera control unit 21.

Further, the camera control unit 21 reads out the outputs of the imaging pixels 221 of the imaging device 22 and uses the read out pixel outputs as the basis to calculate a focus evaluation value. This focus evaluation value can be obtained, for example, by extracting the high frequency components of the image outputs from the imaging pixels 221 of the imaging device 22 using a high frequency pass filter. In an alternative embodiment, it may be obtained by using two high frequency pass filters with different cutoff frequencies to extract the high frequency components.

The camera control unit 21 then sends a drive signal to the lens control unit 36 to drive the focus lens 33 at a predetermined sampling interval (distance), thereby obtaining focus evaluation values at different positions and finding the position of the focus lens 33 at which the focus evaluation value is maximum as a focused position, i.e., performing focus detection by the contrast detection system. This focused position can be obtained, for example, when calculating the focus evaluation values while driving the focus lens 33, by interpolation or other appropriate operation using those focus evaluation values which take a value that rises twice and thereafter drops twice.

Figure 7:
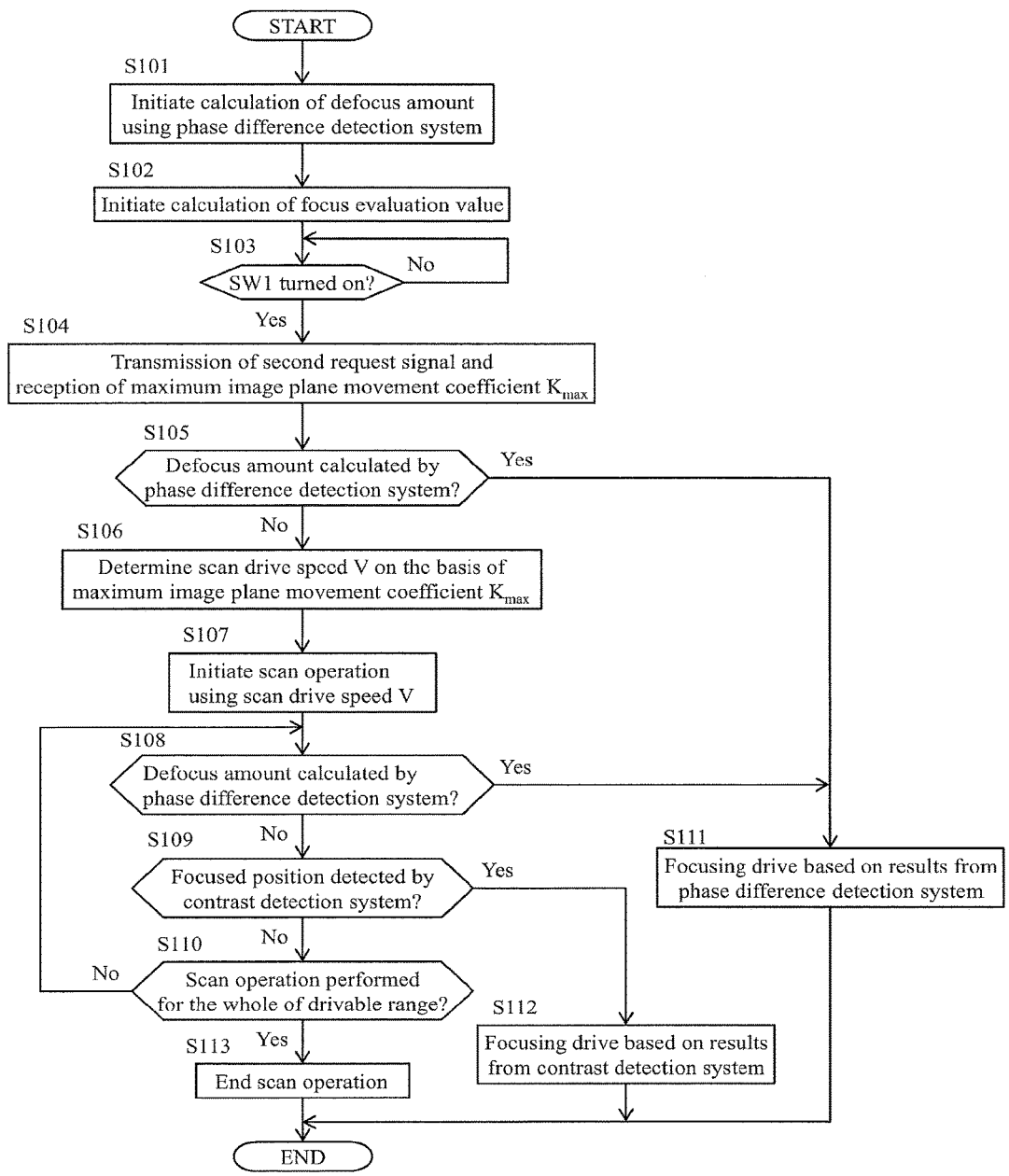
FIG. 7 is a flowchart showing operation of a first embodiment.

An example of the operation of the camera 1 according to the present embodiment will then be described with reference to FIG. 7. FIG. 7 is a flowchart showing an example of the operation of the camera 1 according to the present embodiment. The following operation is initiated by the power of the camera 1 being turned on.

First at step S101, the camera control unit 21 initiates calculation of the defocus amount using the phase difference detection system. According to the present embodiment, the calculation process for the defocus amount using the phase difference detection system is performed as follows. That is, the camera control unit 21 first reads out a pair of image data corresponding to a pair of images from the focus detection pixels 222a and 222b which constitute each of the three focus detection pixel strings 22a to 22c of the imaging device 22. In this case, a configuration is also possible such that when manual operation by the photographer selects a specific focus detection position, only the data from the focus detection pixels corresponding to that focus detection position is read out. The camera control unit 21 then uses the read-out pair of image data as the basis to perform image deviation detection processing (correlation processing), and calculates an image deviation amount at the focus detection position corresponding to each of the three focus detection pixel strings 22a to 22c, which is further converted to the defocus amount. In addition, the camera control unit 21 performs evaluation of the reliability of the calculated defocus amount. Evaluation of the reliability of the defocus amount may for example be performed on the basis of the degree of match of the pair of image data and/or contrast, etc. Such calculation processing of the defocus amount using the phase difference detection system is performed repeatedly at a predetermined interval.

At step S102, the camera control unit 21 initiates a calculation process for the focus evaluation value using the contrast detection system. According to the present embodiment, the calculation process for the focus evaluation value is performed by reading out pixel outputs from the imaging pixels 221 of the imaging device 22, extracting high frequency components of the read-out pixel outputs using a high frequency pass filter, and accumulating them. If a specific focus detection position is selected by manual operation by the photographer, another configuration may also be possible such that pixel outputs are read out only from the imaging pixels 221 corresponding to the selected focus detection position to calculate the focus evaluation value. The calculation process for the focus evaluation value is performed repeatedly at a predetermined interval.

According to the present embodiment, at step S101, at a timing when the phase difference detection system initiates calculation of the defocus amount or at a timing when the contrast detection system initiates a calculation process for the focus evaluation value, or after they are initiated, the stationary communication is initiated between the camera control unit 21 and the lens control unit 36, and a process is performed repeatedly at a predetermined interval such that the lens control unit 36 transmits to the camera control unit 21 lens information which includes the current position image plane movement coefficient $K_{cur}$ corresponding to the current lens position of the zoom lens 32 and the current lens position of the focus lens 33.

At step S103, the camera control unit 21 makes a determination whether or not the shutter release button provided at the operating unit 28 was half pressed (first switch SW1 turned on). If the first switch SW1 was turned on, then the routine proceeds to step S104, while on the other hand, if the first switch SW1 is not turned on, then the routine stands by at step S103 at which calculation of the defocus amount and calculation of the focus evaluation value and further acquisition of lens information using the stationary communication are performed repeatedly until the first switch SW1 is turned on.

At step S104, the camera control unit 21 transmits the second request signal in the non-stationary communication, and the lens control unit 36, after receiving the second request signal in the non-stationary communication from the camera control unit 21, refers to the table (see FIG. 6) stored in the lens memory 37 to transmit to the camera control unit 21 the maximum image plane movement coefficient $K_{max}$ and the minimum image plane movement coefficient $K_{min}$ that correspond to the current lens position of the zoom lens 32. The camera control unit 21 thus receives the maximum image plane movement coefficient $K_{max}$ and the minimum image plane movement coefficient $K_{min}$.

At step S105, the camera control unit 21 makes a determination whether or not the defocus amount was able to be calculated using the phase difference detection system. If the defocus amount was able to be calculated, then the routine proceeds to step S111, while on the other hand, if the defocus amount was not able to be calculated, then the routine proceeds to step S106. Note that, according to the present embodiment, even though the defocus amount was able to be calculated, cases where the calculated defocus amount has low reliability are treated as if the defocus amount was not able to be calculated, and the routine is to proceed to step S106. According to the present embodiment, the reliability of the defocus amount may be determined to be low if the contrast of the object is low, the object is a very low brightness object, or the object is a very high brightness object, for example.

The above determination at step S105 is made using a result of the most recent one-time defocus amount calculation process, but an alternative embodiment may be configured such that, if the defocus amount was successively not able to be calculated or the reliability of the defocus amount was successively low in the most recent predetermined number of defocus amount calculation processes, then the measurement of distance is determined not to be possible and the routine proceeds to step S106, while in contrast, if at least one defocus amount was able to be calculated in the most recent predetermined number of defocus amount calculation processes, then the measurement of distance is determined to be possible and the routine proceeds to step S111.

If, at step S105, the defocus amount was determined to be able to be calculated so that the measurement of distance was determined possible, then the routine proceeds to step S111 at which focusing drive is performed on the basis of the defocus amount calculated using the phase difference detection system. Specifically, the camera control unit 21 calculates, from the defocus amount calculated using the phase difference detection system, a lens drive amount that is necessary to drive the focus lens 33 to the focused position, which is sent to the focus lens drive motor 331 via the lens control unit 36. This allows the focus lens drive motor 331 to drive the focus lens 33 to the focused position on the basis of the lens drive amount calculated by the camera control unit 21.

Note that, according to the present embodiment, even while the focus lens drive motor 331 is driven to drive the focus lens 33 to the focused position, the camera control unit 21 performs repeatedly calculation of the defocus amount using the phase difference detection system, so that if a new defocus amount is calculated, then the camera control unit 21 drives the focus lens 33 on the basis of the new defocus amount.

Then at step S106, the camera control unit 21 uses the maximum image plane movement coefficient $K_{max}$ acquired at step S104 to perform a process of determining a scan drive speed V that is a drive speed for the focus lens 33 in a scan operation. The "scan operation" as used herein is an operation in which the camera control unit 21 concurrently performs calculation of the defocus amount using the phase difference detection system and calculation of the focus evaluation value using the contrast detection system at a predetermined interval while driving the focus lens 33 using the focus lens drive motor 331 at the scan drive speed V determined at step S106, thereby to concurrently and parallelly perform detection of a focused position using the phase difference detection system and detection of a focused position using the contrast detection system at a predetermined interval.

In this scan operation, when the focused position detecting is performed using the contrast detection system, the camera control unit 21 calculates focus evaluation values at a predetermined sampling interval while driving the focus lens 33 for scan, and detects a lens position at which the calculated focus evaluation value is a peak, as the focused position. Specifically, the camera control unit 21 drives the focus lens 33 for scan to move an image plane of the optical system in the optical axis direction thereby, calculates focus evaluation values at different image planes, and detects a lens position at which the focus evaluation value is a peak, as the focused position. If, however, the movement speed of the image plane is unduly high, then the interval of image planes for calculating the focus evaluation values becomes excessively large, so that the focused position may not appropriately be detected. In particular, the image plane movement coefficient K representing the movement amount of an image plane to the drive amount of the focus lens 33 varies depending on the lens position in the optical axis of the focus lens 33, and hence, even when the focus lens 33 is driven at a constant speed, some lens positions of the focus lens 33 cause the movement speed of an image plane to be unduly high, and the interval of image planes for calculating the focus evaluation values thus becomes excessively large, so that the focused position may not appropriately be detected.

Therefore, according to the present embodiment, the camera control unit 21 uses the maximum image plane movement coefficient $K_{max}$ acquired at step S106 as the basis to calculate the scan drive speed V at the time of driving the focus lens 33 for scan. The camera control unit 21 uses the maximum image plane movement coefficient $K_{max}$ to calculate the scan drive speed V so that it is a maximum drive speed among those capable of being used to appropriately detect the focused position using the contrast detection system.

Then at step S107, the scan operation is initiated using the scan drive speed V determined at step S106. Specifically, the camera control unit 21 sends a scan drive initiation command to the lens control unit 36, which uses the command as the basis to drive the focus lens drive motor 331 so that the focus lens 33 is driven for scan at the scan drive speed V determined at step S106. The camera control unit 21 then operates to: read out a pair of image data corresponding to a pair of images from the focus detection pixels 222a and 222b of the imaging device 22 at a predetermined interval while driving the focus lens 33 at the scan drive speed V; use the read-out data as the basis to perform calculation of the defocus amount using the phase difference detection system and evaluation of the reliability of the calculated defocus amount; read out pixel outputs from the imaging pixels 221 of the imaging device 22 at a predetermined interval while driving the focus lens 33 at the scan drive speed V; and use the read-out pixel outputs as the bases to calculate and acquire focus evaluation values at different focus lens positions thereby to perform detection of the focused position using the contrast detection system.

Then at step S108, the camera control unit 21 makes a determination whether or not the defocus amount was able to be calculated using the phase difference detection system as a result of the scan operation. If the defocus amount was able to be calculated, then the measurement of distance is determined to be possible and the routine proceeds to step S111, while on the other hand, if the defocus amount was not able to be calculated, then the measurement of distance is determined not to be possible and the routine proceeds to step S109. Note that, also at step S108, like at step S105, even though the defocus amount was able to be calculated, cases where the calculated defocus amount has low reliability are treated as if the defocus amount was not able to be calculated, and the routine is to proceed to step S109.

At step S109, the camera control unit 21 makes a determination whether or not the focused position was able to be detected using the contrast detection system as a result of the scan operation. If the focused position was able to be detected using the contrast detection system, then the routine proceeds to step S112, while on the other hand, if the focused position was not able to be detected, then the routine proceeds to step S110.

At step S110, the camera control unit 21 makes a determination whether or not the scan operation has been performed for the whole of the drivable range of the focus lens 33. If the scan operation is not performed for the whole of the drivable range of the focus lens 33, then the routine returns to step S108, and steps S108 to S110 are repeated thereby continuing to perform the scan operation, that is, an operation to concurrently perform calculation of the defocus amount using the phase difference detection system and detection of the focused position using the contrast detection system at a predetermined interval while driving the focus lens 33 for scan. If, on the other hand, the scan operation is completed for the whole of the drivable range of the focus lens 33, then the routine proceeds to step S113.

As a result of the scan operation executed, if the determination was made at step S108 that the defocus amount was able to be calculated using the phase difference detection system, then, after processing to stop the scan operation, the routine proceeds to step S111 at which the focusing drive is performed as described above to drive the focus lens 33 to the focused position detected using the phase difference detection system.

Further, as a result of the scan operation executed, if the determination was made at step S109 that the focused position was able to be detected using the contrast detection system, then, after processing to stop the scan operation, the routine proceeds to step S112 at which the camera control unit 21 performs the focusing drive to drive the focus lens 33 to the focused position detected using the contrast detection system.

If the drive of the focus lens 33 was completed after driving the focus lens 33 to the focused position detected using the phase difference detection system or to the focused position detected using the contrast detection system, then the focusing completed is displayed via the electronic viewfinder 26.

If, on the other hand, the determination was made at step S110 that the execution of the scan operation was completed for the whole of the drivable range of the focus lens 33, then the routine proceeds to step S113. At step S113, processing is performed to end the scan operation because as a result of the scan operation performed, the focused position was not able to be detected using the contrast detection system, and thereafter the focusing being impossible is displayed. The display of the focusing being impossible is performed using the electronic viewfinder 26, for example.

As described above, according to the present embodiment, the maximum image plane movement coefficient $K_{max}$, which represents a maximum image plane movement coefficient among a plurality of image plane movement coefficients K stored for respective positions of the focus lens 33, is acquired from the lens control unit 36. The camera control unit 21 uses the maximum image plane movement coefficient $K_{max}$ to calculate the scan drive speed V so that it is a maximum drive speed among those capable of being used to appropriately detect the focused position using the contrast detection system, and hence, the calculation interval for the focus evaluation values (interval of image planes for calculating focus evaluation values) has a value suitable for focus detection even if the focus lens 33 is driven for scan to a position at which the image plane movement coefficient K is a maximum value (e.g. a value equal to the maximum image plane movement coefficient $K_{max}$).

This allows the focused position to appropriately be detected using the contrast detection system according to the present embodiment even if the image plane movement coefficient K becomes large (e.g. a case of being the maximum image plane movement coefficient $K_{max}$) as a result of the image plane movement coefficient K varying as the focus lens 33 is driven in the optical axis direction.

The above-described embodiment exemplifies a configuration in which the maximum image plane movement coefficient $K_{max}$, which represents a maximum image plane movement coefficient among a plurality of image plane movement coefficients K stored for respective positions of the focus lens 33, is acquired from the lens barrel 3, and the scan operation is performed using a scan speed V which is the maximum drive speed for the focus lens 33 that allows the focus detection to appropriately be performed using the contrast detection system even if the image plane movement coefficient K at the time of driving the focus lens 33 is the same as the acquired maximum image plane movement coefficient $K_{max}$, but the present invention is not limited to this configuration, and another configuration may also be employed as below, for example.

That is, a larger one of two coefficients is acquired as a predetermined image plane movement coefficient $K_{pre}$ from the lens barrel 3, wherein one of the two coefficients is a first image plane movement coefficient $K_1$ that corresponds to a first position at the near end side from the current lens position of the focus lens 33 while the other is a second image plane movement coefficient $K_2$ that corresponds to a second position at the infinite end side from the current lens position of the focus lens 33. In this case, a configuration may be employed such that the scan operation is performed using a scan speed V which is the maximum drive speed for the focus lens 33 that allows the focus detection to appropriately be performed using the contrast detection system even if the image plane movement coefficient K at the time of driving the focus lens 33 is the predetermined image plane movement coefficient $K_{pre}$ when the scan operation is performed.

Or, if a predetermined image plane movement coefficient $K_{pre}$ that corresponds to a predetermined lens position of the focus lens 33 is larger than the image plane movement coefficient $K_{cur}$ at the current lens position of the focus lens 33, then the predetermined image plane movement coefficient $K_{pre}$ is to be acquired from the lens barrel 3. In this case, a configuration may be employed such that the scan operation is performed using a scan speed V which is the maximum drive speed for the focus lens 33 that allows the focus detection to appropriately be performed using the contrast detection system even if the image plane movement coefficient K at the time of driving the focus lens 33 is the acquired predetermined image plane movement coefficient $K_{pre}$ when the scan operation is performed.

An alternative configuration may be employed such that the operation according to the above-described embodiment is executed only when a high magnification zoom lens is used as the lens barrel 3. A high magnification zoom lens has a tendency that the image plane movement coefficient becomes large, and the accuracy in detection of the focused position using the contrast detection system can thus be enhanced compared with the conventional technique.

Second Embodiment

A second embodiment according to the present invention will then be described. The second embodiment has the same configuration as that of the above-described first embodiment except that the camera 1 shown in FIG. 1 operates as will be described below.

That is, the second embodiment has an additional feature that, in the flowchart shown in FIG. 7, after the focused position was able to be detected at step S109 using the contrast detection system, when performing at step S112 the focusing drive on the basis of the result of the contrast detection system, a determination is made whether or not to perform drive for reducing play, and this determination is used as the basis to change the drive scheme for the focus lens 33 at the time of performing the focusing drive from the scheme in the above-described first embodiment, so in this respect the second embodiment differs from the first embodiment, but other features are the same as those of the first embodiment.

Figure 8:
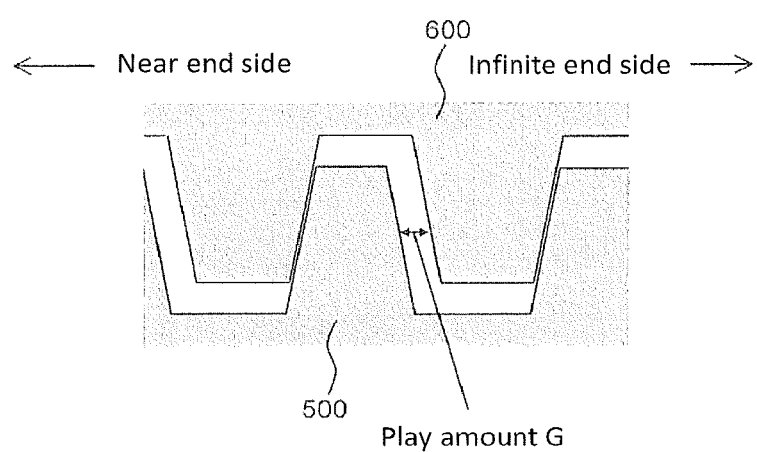
FIG. 8 is a view for explaining a play amount G of a drive transmission mechanism for the focus lens 33.

In general, the focus lens drive motor 331 for driving the focus lens 33 as shown in FIG. 1 is configured of a mechanical drive transmission mechanism which, for example, comprises a first drive mechanism 500 and a second drive mechanism 600 as shown in FIG. 8, and is configured such that the first drive mechanism 500 is driven to drive the second drive mechanism 600 at the side of the focus lens 33 thereby to move the focus lens 33 to the near end side or the infinite end side. In such a drive transmission mechanism, a play amount G is ordinarily provided in view of smooth operation of engaging parts of gears. In the contrast detection system, however, due to its mechanism, the focus lens 33 may have to be driven as shown in (A) and (B) of FIG. 9 such that the focus lens 33 once passes through the focused position in the scan operation and then moves to the focused position after reversing the driving direction. Thus, the characteristic in this case is such that, if the drive for reducing play is not performed as shown in (B) of FIG. 9, then the lens position of the focus lens 33 is shifted exactly by the play amount G. For this reason, in order to eliminate such an effect due to the play amount G, as shown in (A) of FIG. 9, when performing the focusing drive for the focus lens 33, it may be necessary to perform the drive for reducing play in which the focus lens 33 once passes through the focused position and is then driven to the focused position by reversing again the driving direction.

Figure 9:
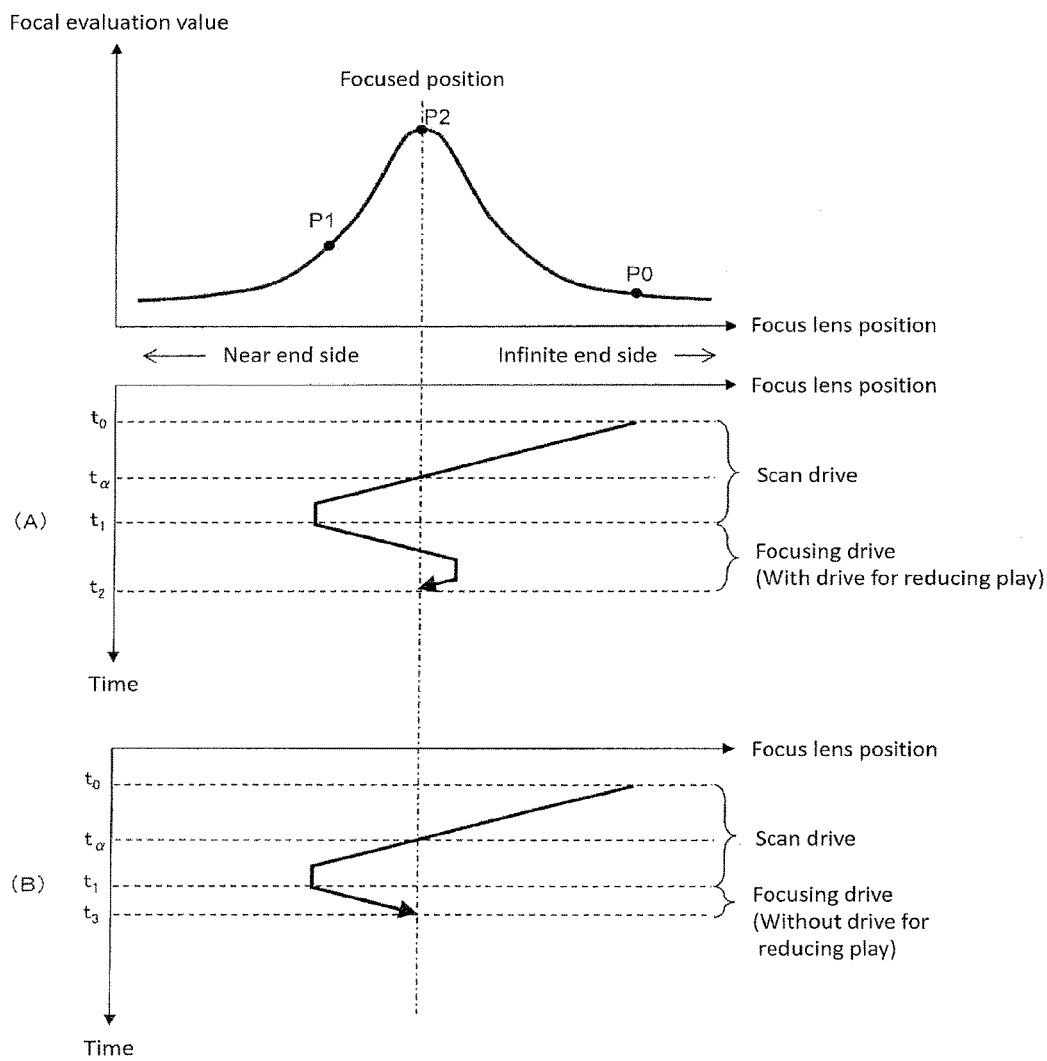
FIG. 9 is a set of diagrams which show a relationship between a focus lens position and a focus evaluation value and relationships between a focus lens position and time when a scan operation and focusing drive based on a contrast detection system are performed according to a below embodiment.

FIG. 9 is a set of diagrams which show a relationship between the focus lens position and the focus evaluation value and relationships between the focus lens position and time when the scan operation and the focusing drive based on the contrast detection system are performed according to the present embodiment. (A) of FIG. 9 shows an aspect that, after initiating at time $t_0$ the scan operation for the focus lens 33 from the lens position P0 in the direction from the infinite end side to the near end side, if the peak position (focused position) P2 of the focus evaluation value is detected at the time when the focus lens 33 is moved to the lens position P1 at time $t_1$, then the scan operation is stopped and the focusing drive is performed along with the drive for reducing play thereby to drive the focus lens 33 to the focused position at time $t_2$. On the other hand, (B) of FIG. 9 shows an aspect that, after initiating at time $t_0$ the scan operation in the same way, the scan operation is stopped at time $t_1$ and the focusing drive is performed without the drive for reducing play thereby to drive the focus lens 33 to the focused position at time $t_3$.

An example of operation according to the second embodiment will now be described with reference to the flowchart shown in FIG. 10. The operation below is executed if the focused position was detected using the contrast detection system at step S109 in the above-described flowchart shown in FIG. 7. That is, as shown in (A) and (B) of FIG. 9, after initiating the scan operation from time $t_0$, if the peak position (focused position) P2 of the focus evaluation value was detected at the time when the focus lens 33 was moved to the lens position P1 at time $t_1$, then the operation is executed from at time $t_1$.

More specifically, if the focused position is detected using the contrast detection system, then the camera control unit 21 performs at step S201 acquisition of the current position image plane movement coefficient $K_{cur}$ at the current position of the zoom lens 32 and the current position of the focus lens 33. For example, referring to (A) and (B) of FIG. 9, a current image plane movement coefficient K corresponding to the lens position P1 at time $t_0$ is acquired as the current position image plane movement coefficient $K_{cur}$. The current position image plane movement coefficient $K_{cur}$ can be acquired from the lens control unit 36 via the lens transceiver unit 38 and the camera control unit 21 using the above-described stationary communication which is being performed between the camera control unit 21 and the lens control unit 36.

Then at step S202, the camera control unit 21 performs acquisition of information regarding the play amount G (see FIG. 8) of the drive transmission mechanism for the focus lens 33. The play amount G of the drive transmission mechanism for the focus lens 33 can be acquired for example by preliminarily storing it in the lens memory 37 provided in the lens barrel 3 and referring to it. More specifically, the camera control unit 21 sends a transmission request for the play amount G of the drive transmission mechanism for the focus lens 33 to the lens control unit 36 via the camera transceiver unit 29 and the lens transceiver unit 38 so that the lens control unit 36 transmits the play amount G of the drive transmission mechanism for the focus lens 33 stored in the lens memory 37. An alternative embodiment may also be possible such that the information regarding the play amount G of the drive transmission mechanism for the focus lens 33 stored in the lens memory 37 is incorporated in the lens information to be transmitted and received in the above-described stationary communication which is being performed between the camera control unit 21 and the lens control unit 36.

Then at step S203, the camera control unit 21 calculates an image plane movement amount $I_G$ corresponding to the play amount G on the basis of the above-described current position image plane movement coefficient $K_{cur}$ acquired at step S201 and the above-described information regarding the play amount G of the drive transmission mechanism for the focus lens 33 acquired at step S202. The image plane movement amount $I_G$ corresponding to the play amount G is a movement amount of the image plane when the focus lens is driven exactly by the same amount as the play amount G, and can be calculated in accordance with Expression (2) below in the present embodiment.

$$\text{(Image plane movement amount } I_G \text{ corresponding to play amount } G) = (\text{Play amount } G) \times (\text{Current position image plane movement coefficient } K_{cur}) \quad (2)$$

Then at step S204, the camera control unit 21 performs a process of comparing the above-described image plane movement amount $I_G$ corresponding to the play amount G calculated at step S203 with a predetermined image plane movement amount $I_P$, and the result of this comparison is used to make a determination whether the image plane movement amount $I_G$ corresponding to the play amount G is not larger than the predetermined image plane movement amount $I_P$, i.e., whether a condition of (Image plane movement amount $I_G$ corresponding to play amount G)≤(Predetermined image plane movement amount $I_P$) is satisfied or not. The predetermined image plane movement amount $I_P$ may be set to correspond to the focal depth of the optical system, and is ordinarily to be an image plane movement amount that corresponds to the focal depth. An alternative embodiment may also be possible such that the predetermined image plane movement amount $I_P$ is appropriately set depending on the F-value, cell size of the imaging device 22 or the format of an image to be captured, etc. because the predetermined image plane movement amount $I_P$ is set to correspond to the focal depth of the optical system. Specifically, the predetermined image plane movement amount $I_P$ may be set a larger value as the F-value increases. Alternatively or in addition, the predetermined image plane movement amount $I_P$ may be set at a larger value as the cell size of the imaging device 22 increases or the image format is reduced. If the image plane movement amount $I_G$ corresponding to the play amount G is not larger than the predetermined image plane movement amount $I_P$, then the routine proceeds to step S205. If, on the other hand, the image plane movement amount $I_G$ corresponding to the play amount G is larger than the predetermined image plane movement amount $I_P$, then the routine proceeds to step S206.

At step S205, it has been determined at the above-described step S204 that the image plane movement amount $I_G$ corresponding to the play amount G is not larger than the predetermined image plane movement amount $I_P$, in which case it is determined that the lens position of the focus lens 33 after the drive can fall within the focal depth of the optical system even without the drive for reducing play and that the drive for reducing play is not to be performed at the time of focusing drive, and such determination is used as the basis to perform the focusing drive without the drive for reducing play. That is, a determination is made that the focus lens 33 is driven directly to the focused position at the time of performing the focusing drive, and this determination is used as the basis to perform the focusing drive without the drive for reducing play, as shown in (B) of FIG. 9.

At step S206, on the other hand, it has been determined at the above-described step S204 that the image plane movement amount $I_G$ corresponding to the play amount G is larger than the predetermined image plane movement amount $I_P$, in which case it is determined that the lens position of the focus lens 33 after the drive cannot fall within the focal depth of the optical system if the drive for reducing play is not performed and that the drive for reducing play is to be performed at the time of focusing drive, and such determination is used as the basis to perform the focusing drive along with the drive for reducing play. That is, a determination is made that, at the time of performing the focusing drive, the focus lens 33 is driven to once pass through the focused position and then driven to the focused position by reversing again the driving direction, and this determination is used as the basis to perform the focusing drive along with the drive for reducing play, as shown in (A) of FIG. 9.

According to the second embodiment, as described above, the current position image plane movement coefficient $K_{cur}$ and the information regarding the play amount G of the drive transmission mechanism for the focus lens 33 are used as the basis to calculate the image plane movement amount $I_G$ corresponding to the play amount G, and a determination is made whether the calculated image plane movement amount $I_G$ corresponding to the play amount G is not larger than the predetermined image plane movement amount $I_P$ corresponding to the focal depth of the optical system, thereby to determine whether or not to perform the drive for reducing play at the time of performing the focusing drive. As a result of the determination, if the image plane movement amount $I_G$ corresponding to the play amount G is not larger than the predetermined image plane movement amount $I_P$ corresponding to the focal depth of the optical system and the lens position of the focus lens 33 after the drive can therefore fall within the focal depth of the optical system, then the drive for reducing play is not performed, while on the other hand, if the image plane movement amount $I_G$ corresponding to the play amount G is larger than the predetermined image plane movement amount $I_P$ corresponding to the focal depth of the optical system and the lens position of the focus lens 33 after the drive therefore cannot fall within the focal depth of the optical system without the drive for reducing play, then the drive for reducing play is performed. Therefore, according to the present embodiment, if the drive for reducing play is not necessary, then the drive for reducing play is not performed, so that the time required for the focusing drive can be reduced, and the time relevant to the focusing operation can thereby be reduced. On the other hand, if the drive for reducing play is necessary, then the drive for reducing play is performed and the accuracy in focusing can thus be enhanced.

In particular, according to the second embodiment, the image plane movement coefficient K, which varies depending on the lens position of the zoom lens 32 and the lens position of the focus lens 33, is used to calculate the image plane movement amount $I_G$ corresponding to the play amount G, which is compared with the predetermined image plane movement amount $I_P$ corresponding to the focal depth of the optical system, and it can thereby be possible to appropriately determine whether the drive for reducing play at the time of focusing is necessary or not.

Third Embodiment

A third embodiment according to the present invention will then be described. The third embodiment has the same configuration as that of the above-described second embodiment except that the camera 1 shown in FIG. 1 operates as will be described below.

The above-described second embodiment has been exemplified in which the image plane movement amount $I_G$ corresponding to the play amount G is calculated using the current position image plane movement coefficient $K_{cur}$ that corresponds to the lens position of the zoom lens 32 and the lens position of the focus lens 33 at the time of initiating the reverse drive after completing the scan operation for the focus lens 33 when calculating the image plane movement amount $I_G$ corresponding to the play amount G. In contrast, according to the third embodiment, the maximum image plane movement coefficient $K_{max}$ corresponding to the current lens position of the zoom lens 32 is used as substitute for the current position image plane movement coefficient $K_{cur}$ to calculate the image plane movement amount $I_G$ corresponding to the play amount G, and in this regard the third embodiment differs from the above-described second embodiment.

Figure 11:
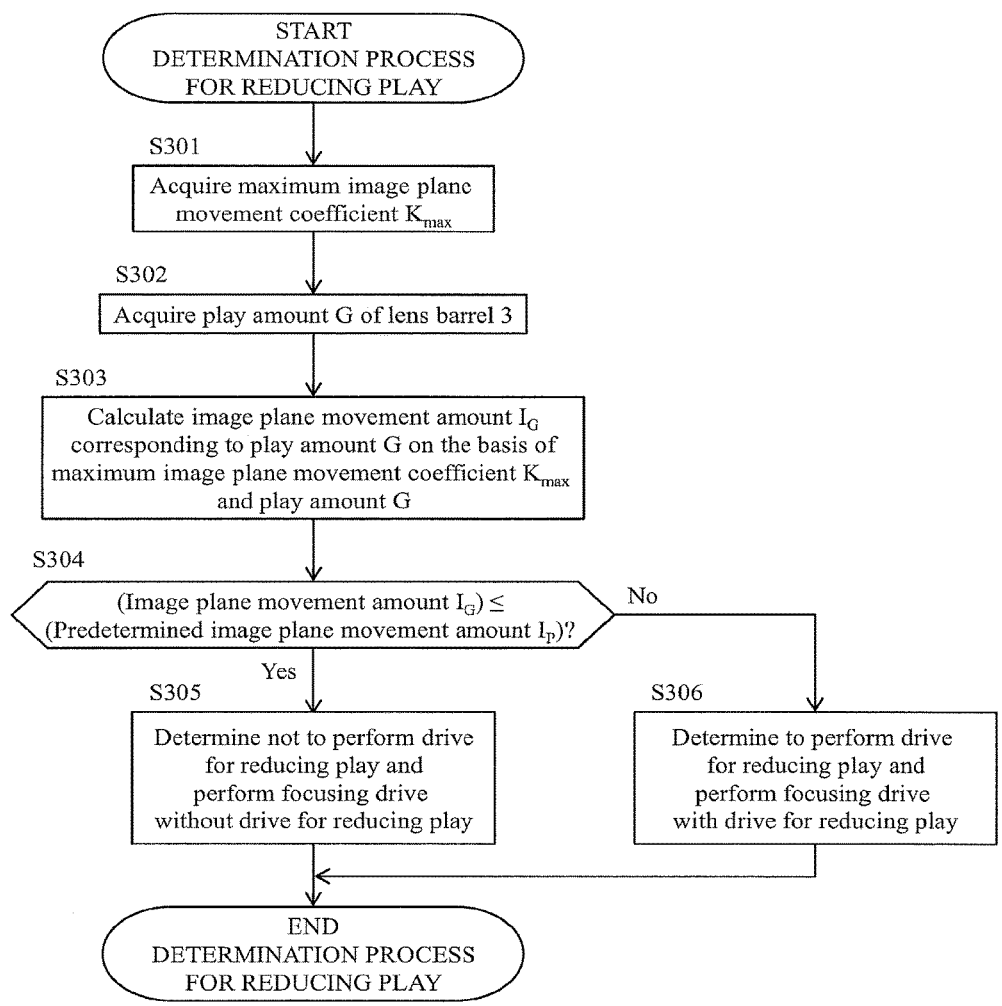
FIG. 11 is a flowchart showing operation according to a third embodiment.

An example of operation according to the third embodiment will now be described with reference to the flowchart shown in FIG. 11. Like in the above-described second embodiment, the operation below is executed if the focused position was detected using the contrast detection system at step S109 in the above-described flowchart shown in FIG. 7.

More specifically, if the focused position is detected using the contrast detection system, then the camera control unit 21 performs at step S301 acquisition of the maximum image plane movement coefficient $K_{max}$ at the current position of the zoom lens 32. For example, if the lens position of the zoom lens 32 (focal distance) is at "f5" in the table shown in FIG. 6, then "K52" in gray cell is acquired as the maximum image plane movement coefficient $K_{max}$.

According to the present embodiment, the timing when the camera control unit 21 acquires the maximum image plane movement coefficient $K_{max}$ may be a time when the reverse drive of the focus lens 33 is executed after the focused position was detected using the contrast detection system, but may otherwise be a time when the shutter release button provided at the operating unit 28 was half pressed (first switch SW1 turned on) or a time when the focus adjustment operation was initiated due to the half-press of the shutter release button. That is, for the acquisition of the maximum image plane movement coefficient $K_{max}$ at the time when the shutter release button was half pressed or at the time when the focus adjustment operation was initiated due to the half-press of the shutter release button, the camera control unit 21 may send at such a time a signal requesting the transmission of the maximum image plane movement coefficient $K_{max}$ via the camera transceiver unit 29 and the lens transceiver unit 38, thereby to acquire it. In this case, the lens control unit 36 may be configured to: receive from the camera control unit 21 the signal requesting the transmission of the maximum image plane movement coefficient $K_{max}$; use this as the basis to refer to the table which is stored in the lens memory 37 and represents the relationship between each lens position and the image plane movement coefficient K thereby to acquire the maximum image plane movement coefficient $K_{max}$; and transmit it to the camera control unit 21 via the lens transceiver unit 38 and the camera transceiver unit 29.

An alternative configuration may also be possible such that the camera control unit 21 acquires the maximum image plane movement coefficient $K_{max}$ also in the case where the lens position of the zoom lens 32 varies, because driving the zoom lens 32 may cause the lens position of the zoom lens 32 to vary and therefore cause the maximum image plane movement coefficient $K_{max}$ to be different.

Figure 10:
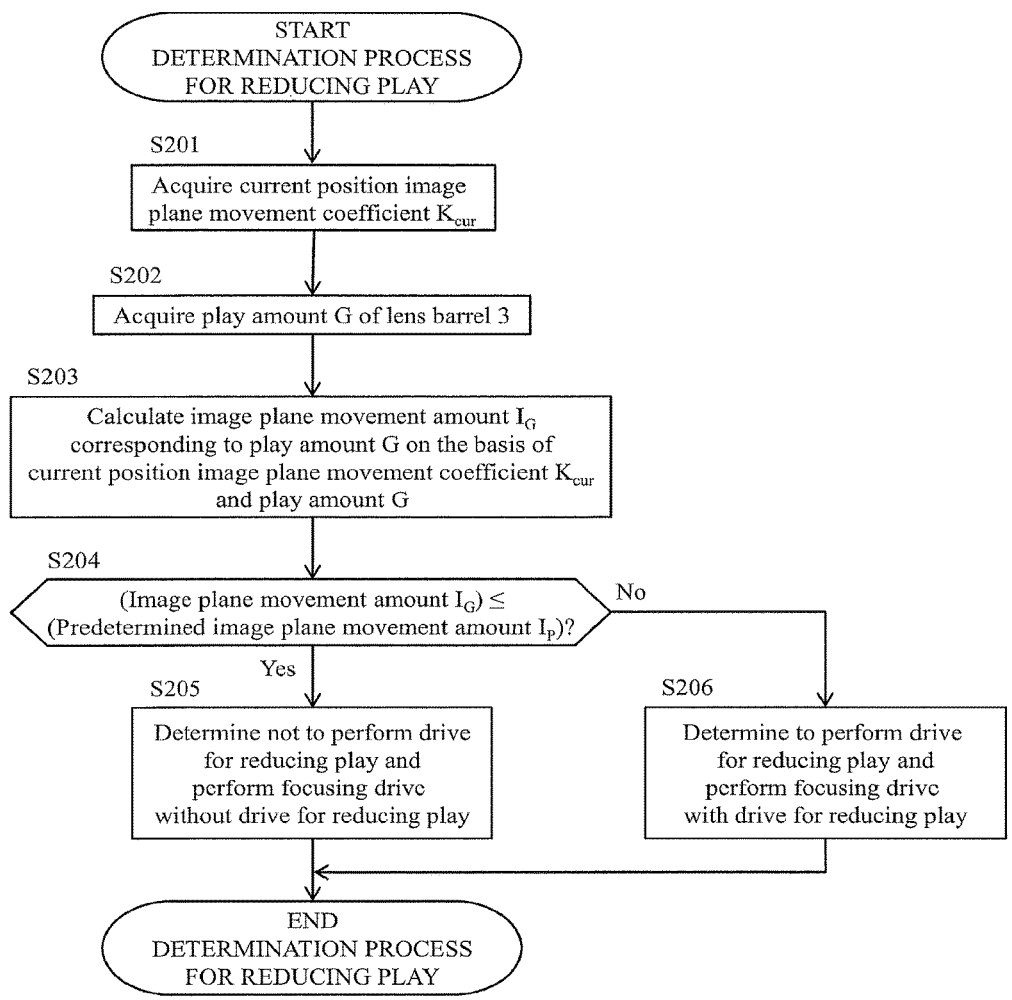
FIG. 10 is a flowchart showing operation according to the second embodiment.

Then at step S302, like at the above-described step S202 shown in FIG. 10, the camera control unit 21 performs acquisition of information regarding the play amount G (see FIG. 8) of the drive transmission mechanism for the focus lens 33.

Then at step S303, the camera control unit 21 calculates an image plane movement amount $I_G$ corresponding to the play amount G on the basis of the above-described maximum image plane movement coefficient $K_{max}$ acquired at step S301 and the above-described information regarding the play amount G of the drive transmission mechanism for the focus lens 33 acquired at step S302. The image plane movement amount $I_G$ corresponding to the play amount G is a movement amount of the image plane when the focus lens is driven exactly by the same amount as the play amount G, and can be calculated in accordance with Expression (3) below in the present embodiment.

$$(\text{Image plane movement amount } I_G \text{ corresponding to play amount } G) = (\text{Play amount } G) \times (\text{Maximum image plane movement coefficient } K_{max}) \quad (3)$$

Then at step S304, like at the above-described step S204 shown in FIG. 10, the camera control unit 21 performs a process of comparing the above-described image plane movement amount $I_G$ corresponding to the play amount G calculated at step S303 with a predetermined image plane movement amount $I_P$, and the result of this comparison is used to make a determination whether the image plane movement amount $I_G$ corresponding to the play amount G is not larger than the predetermined image plane movement amount $I_P$, i.e., whether a condition of (Image plane movement amount $I_G$ corresponding to play amount G)≤(Predetermined image plane movement amount $I_P$) is satisfied or not. The predetermined image plane movement amount $I_P$ may be set in the same way as the above-described second embodiment.

At step S305, it has been determined at the above-described step S304 that the image plane movement amount $I_G$ corresponding to the play amount G is not larger than the predetermined image plane movement amount $I_P$, in which case, like at the above-described step S205 shown in FIG. 10, it is determined that the lens position of the focus lens 33 after the drive can fall within the focal depth of the optical system even without the drive for reducing play and that the drive for reducing play is not to be performed at the time of focusing drive, and such determination is used as the basis to perform the focusing drive without the drive for reducing play.

At step S306, on the other hand, it has been determined at the above-described step S304 that the image plane movement amount $I_G$ corresponding to the play amount G is larger than the predetermined image plane movement amount $I_P$, in which case, like at the above-described step S206 shown in FIG. 10, it is determined that the lens position of the focus lens 33 after the drive cannot fall within the focal depth of the optical system if the drive for reducing play is not performed and that the drive for reducing play is to be performed at the time of focusing drive, and such determination is used as the basis to perform the focusing drive along with the drive for reducing play.

According to the third embodiment, advantageous effects can be obtained in addition to those in the above-described second embodiment.

That is, the third embodiment can prevent effectively that, even when the drive for reducing play is actually necessary, the drive for reducing play may nevertheless be determined to be unnecessary depending on the lens position of the focus lens 33, because the maximum image plane movement coefficient $K_{max}$, which is set for each lens position of the zoom lens 32, is used in the third embodiment to calculate the image plane movement amount $I_G$ corresponding to the play amount G of the drive transmission mechanism for the focus lens 33, so that it is possible to determine whether or not the drive for reducing play at the time of focusing is necessary regardless of the lens position of the focus lens 33. In particular, if a lens barrel is used which has a characteristic that the image plane movement coefficient K significantly varies despite the same lens position of the zoom lens 32 when the lens position of the focus lens 33 varies, then, even when the drive for reducing play is actually necessary, the possibility that the drive for reducing play is determined to be unnecessary is high, so in such a case the present embodiment is particularly effective.

Thus, depending on the types of lens barrels, due to their structure, the ratio of the change in the image plane movement coefficient K to the change in the lens position of the focus lens 33 is considered to be different. In this regard, a modified embodiment may be configured such that, for example, when the lens barrel 3 is attached to the camera body 2, a determination is made whether the ratio of the change in the image plane movement coefficient K to the change in the lens position of the focus lens 33 is not smaller than a predetermined threshold, and if not smaller than the predetermined threshold, then the maximum image plane movement coefficient $K_{max}$ is used like in the third embodiment, while if smaller than the predetermined threshold, then the current position image plane movement coefficient $K_{cur}$ is used like in the second embodiment, thus appropriately performing such selection.

Fourth Embodiment

A fourth embodiment according to the present invention will then be described. The fourth embodiment has the same configuration as that of the above-described second embodiment except that the camera 1 shown in FIG. 1 operates as will be described below.

The above-described second embodiment has been exemplified in which the image plane movement amount $I_G$ corresponding to the play amount G is calculated using the current position image plane movement coefficient $K_{cur}$ that corresponds to the lens position of the zoom lens 32 and the lens position of the focus lens 33 at the time of initiating the reverse drive after completing the scan operation for the focus lens 33 when calculating the image plane movement amount $I_G$ corresponding to the play amount G. In contrast, according to the fourth embodiment, as substitute for the current position image plane movement coefficient $K_{cur}$, the image plane movement coefficient K that corresponds to the lens position of the focus lens 33 when located in the vicinity of the focused position is acquired as a focusing vicinity image plane movement coefficient $K_{fou}$, which is used to calculate the image plane movement amount $I_G$ corresponding to the play amount G, thus in this regard the fourth embodiment differs from the above-described second embodiment.

Figure 12:
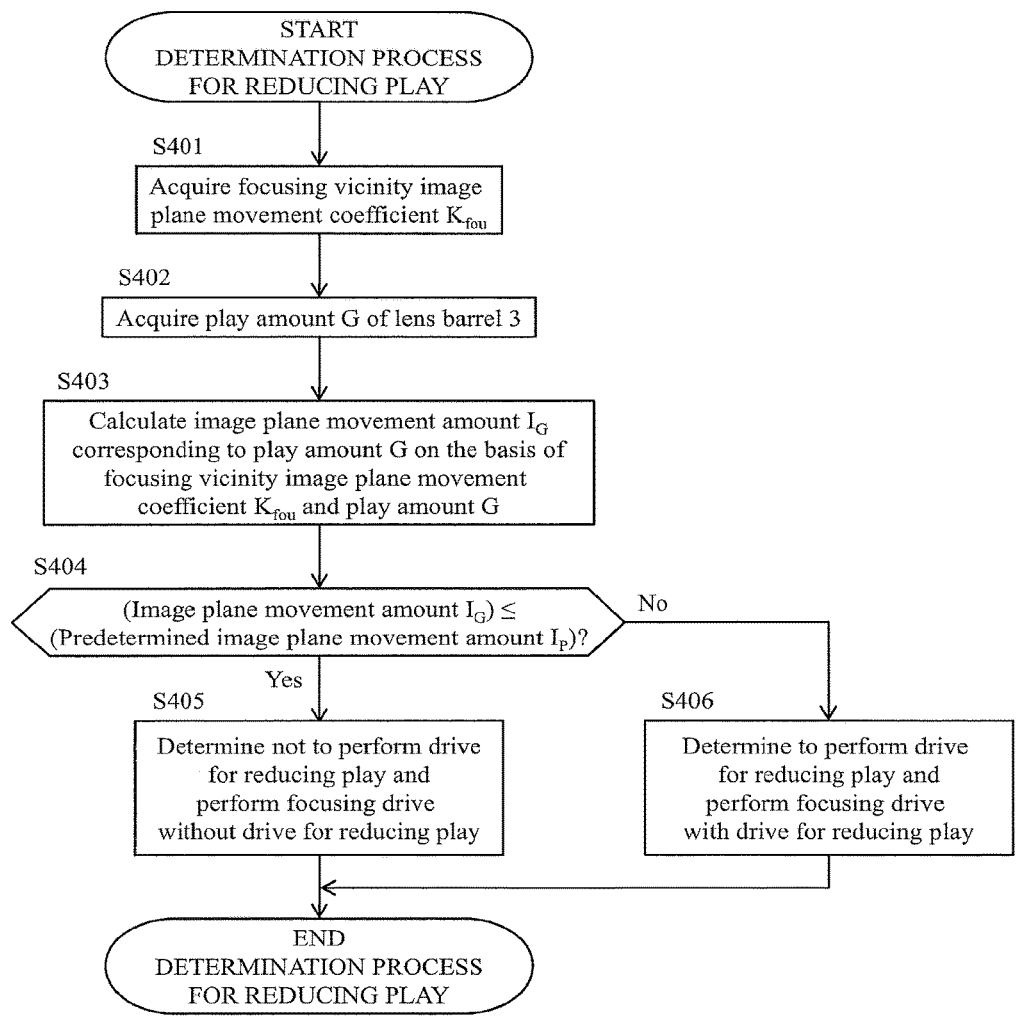
FIG. 12 is a flowchart showing operation according to a fourth embodiment.

An example of operation according to the fourth embodiment will now be described with reference to the flowchart shown in FIG. 12. Like in the above-described second embodiment, the operation below is executed if the focused position was detected using the contrast detection system at step S109 in the above-described flowchart shown in FIG. 7.

More specifically, if the focused position is detected using the contrast detection system, then the camera control unit 21 performs at step S401 a process of acquiring the image plane movement coefficient K that corresponds to the lens position of the focus lens 33 when located in the vicinity of the focused position as a focusing vicinity image plane movement coefficient $K_{fou}$. The method of acquiring the focusing vicinity image plane movement coefficient $K_{fou}$ may be as follows, for example. That is, while executing the scan operation for the focus lens 33, the camera control unit 21 stores sequentially the image plane movement coefficient K corresponding to the current lens position, which is acquired using the stationary communication between the camera control unit 21 and the lens control unit 36, along with information regarding the lens position of the focus lens 33. When the focused position is then detected, the image plane movement coefficient K when the focus lens 33 was located in the vicinity of the focused position is read out, which can be used as the focusing vicinity image plane movement coefficient $K_{fou}$.

Then at step S402, like at the above-described step S202 shown in FIG. 10, the camera control unit 21 performs acquisition of information regarding the play amount G (see FIG. 8) of the drive transmission mechanism for the focus lens 33.

Then at step S403, the camera control unit 21 calculates an image plane movement amount $I_G$ corresponding to the play amount G on the basis of the above-described focusing vicinity image plane movement coefficient $K_{fou}$ acquired at step S401 and the above-described information regarding the play amount G of the drive transmission mechanism for the focus lens 33 acquired at step S402. The image plane movement amount $I_G$ corresponding to the play amount G is a movement amount of the image plane when the focus lens is driven exactly by the same amount as the play amount G, and can be calculated in accordance with Expression (4) below in the present embodiment.

(Image plane movement amount $I_G$ corresponding to play amount G)=(Play amount G)×(Focusing vicinity image plane movement coefficient $K_{fou}$) (4)

Then at step S404, like at the above-described step S204 shown in FIG. 10, the camera control unit 21 performs a process of comparing the above-described image plane movement amount $I_G$ corresponding to the play amount G calculated at step S403 with a predetermined image plane movement amount $I_P$, and the result of this comparison is used to make a determination whether the image plane movement amount $I_G$ corresponding to the play amount G is not larger than the predetermined image plane movement amount $I_P$, i.e., whether a condition of (Image plane movement amount $I_G$ corresponding to play amount G)≤(Predetermined image plane movement amount $I_P$) is satisfied or not. The predetermined image plane movement amount $I_P$ may be set in the same way as the above-described second embodiment.

At step S405, it has been determined at the above-described step S404 that the image plane movement amount $I_G$ corresponding to the play amount G is not larger than the predetermined image plane movement amount $I_P$, in which case, like at the above-described step S205 shown in FIG. 10, it is determined that the lens position of the focus lens 33 after the drive can fall within the focal depth of the optical system even without the drive for reducing play and that the drive for reducing play is not to be performed at the time of focusing drive, and such determination is used as the basis to perform the focusing drive without the drive for reducing play.

At step S406, on the other hand, it has been determined at the above-described step S404 that the image plane movement amount $I_G$ corresponding to the play amount G is larger than the predetermined image plane movement amount $I_P$, in which case, like at the above-described step S206 shown in FIG. 10, it is determined that the lens position of the focus lens 33 after the drive cannot fall within the focal depth of the optical system if the drive for reducing play is not performed and that the drive for reducing play is to be performed at the time of focusing drive, and such determination is used as the basis to perform the focusing drive along with the drive for reducing play.

According to the fourth embodiment, advantageous effects can be obtained in addition to those in the above-described second embodiment.

That is, according to the fourth embodiment, when calculating the image plane movement amount $I_G$ corresponding to the play amount G of the drive transmission mechanism for the focus lens 33, the focusing vicinity image plane movement coefficient $K_{fou}$ is used which is the image plane movement coefficient that corresponds to the lens position of the focus lens 33 when located in the vicinity of the focused position, in which case the calculated image plane movement amount $I_G$ corresponding to the play amount G can be based on the image plane movement coefficient when the focus lens 33 was actually driven to the focused position. Accordingly, the fourth embodiment can calculate the image plane movement amount $I_G$ corresponding to the play amount G with higher accuracy, and it is thereby possible to further appropriately make a determination whether the drive for reducing play is necessary or not.

Fifth Embodiment

A fifth embodiment according to the present invention will then be described. In the fifth embodiment, the description of a similar configuration to that of the above-described first embodiment will be omitted.

The operation according to the fifth embodiment described below can be executed in combination with any of those according to the above-described first to fourth embodiments, or solely executed separately from those according to the first to fourth embodiments.

Figure 13:
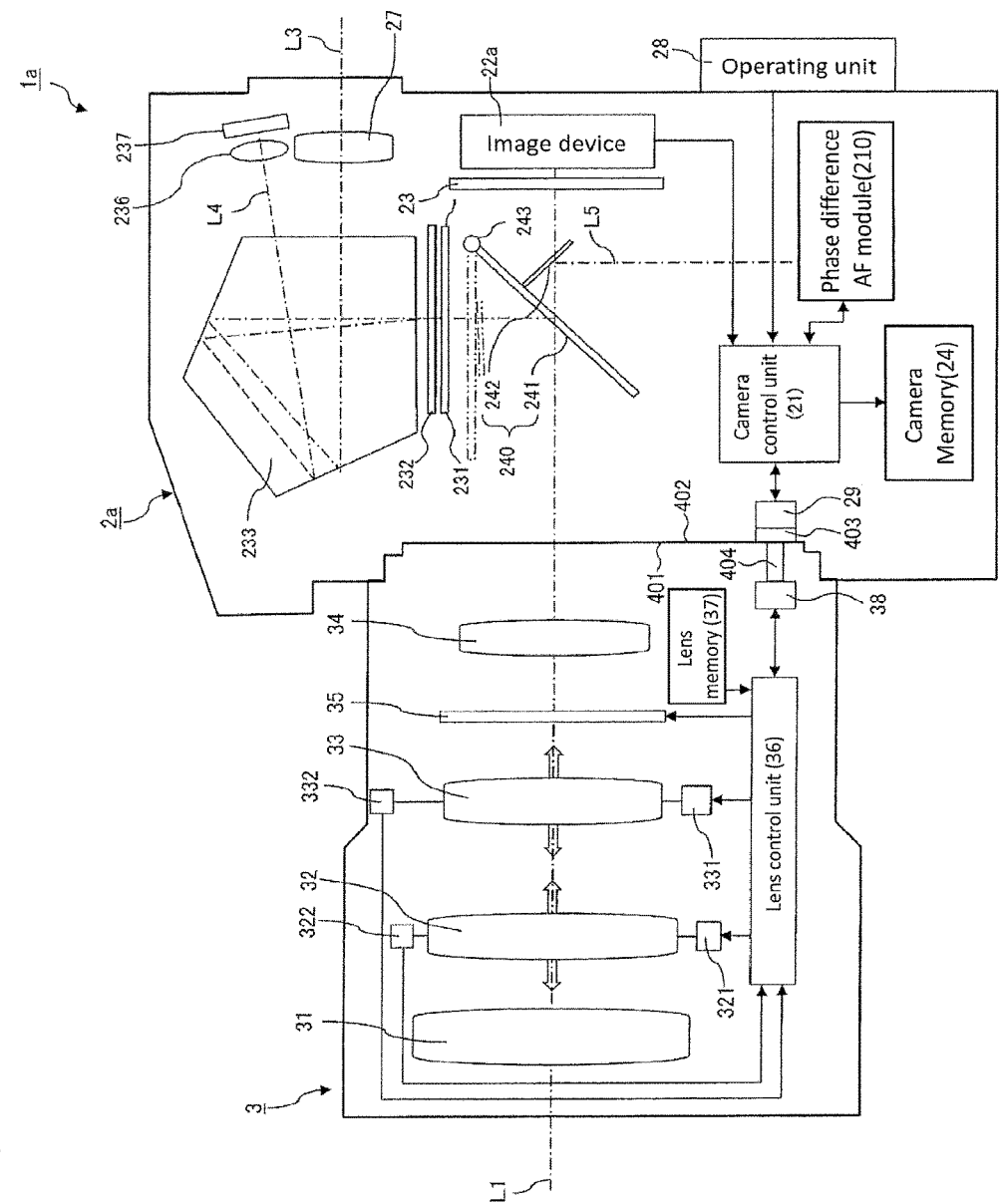
FIG. 13 is a block diagram showing a camera according to a fifth embodiment.

Single-lens reflex digital camera 1a according to the fifth embodiment, as shown in FIG. 13, comprises a camera body 2a, a mirror system 240, a phase difference AF module 210 and a finder optical system, and in this regard it has a different configuration from that of the above-described camera 1.

The mirror system 240 comprises: a quick return mirror 241 that moves pivotally around a pivot axis 243 within a predetermined angular range between an observing position and an imaging position to an object; and a sub mirror 242 that is supported pivotally at the quick return mirror 241 and moves pivotally in synchronization with the pivotal movement of the quick return mirror 241. In FIG. 13, a state where the mirror system 240 is located at the observing position to an object is indicated by solid lines, while a state where the mirror system 240 is located at the imaging position to an object is indicated by two-dot chain lines.

The quick return mirror 241 is configured of a half mirror and, in a state of being at the observing position to an object, reflects part of light beams (optical axes L3 and L4) of those from an object (optical axis L1) to guide them to the finder 135 and the photometric sensor 137 while transmitting the remaining light beams (optical axis L5) to guide them to the sub mirror 242. In contrast, the sub mirror 242 is configured of a total reflection mirror and guides the light beams (optical axis L4) transmitted through the quick return mirror 241 to the phase difference AF module 210.

The light beams from an object reflected by the quick return mirror 241 form an image on a focusing screen 231 arranged at a plane optically equivalent to an imaging device 22a, thereby being observable via a pentaprism 233 and an ocular lens 234. At this time, a transmissive-type liquid crystal display device 232 superimposes indications such as a focus detection area mark onto the image of an object projected on the focal plane plate 131 to display them.

The operating unit 28 has a live-view imaging ON/OFF switch (not shown). When the live-view imaging is turned OFF and the mirror system 240 is in a state of being at the observing position to an object, the phase difference AF can be performed using the phase difference AF module 210. In addition, if the live-view imaging is turned ON, then the mirror system 240 comes at the imaging position to an object and a state is obtained in which the light beams from an object are guided to the imaging device 22a (such as a state where a through image is displayed), so that the contrast AF can be performed. In this case, a similar operation to those in the above first to fourth embodiments can be performed. Examples of the operation according to the fifth embodiment will then be described in detail with reference to FIGS. 14, 15 and 16.

Figure 14:
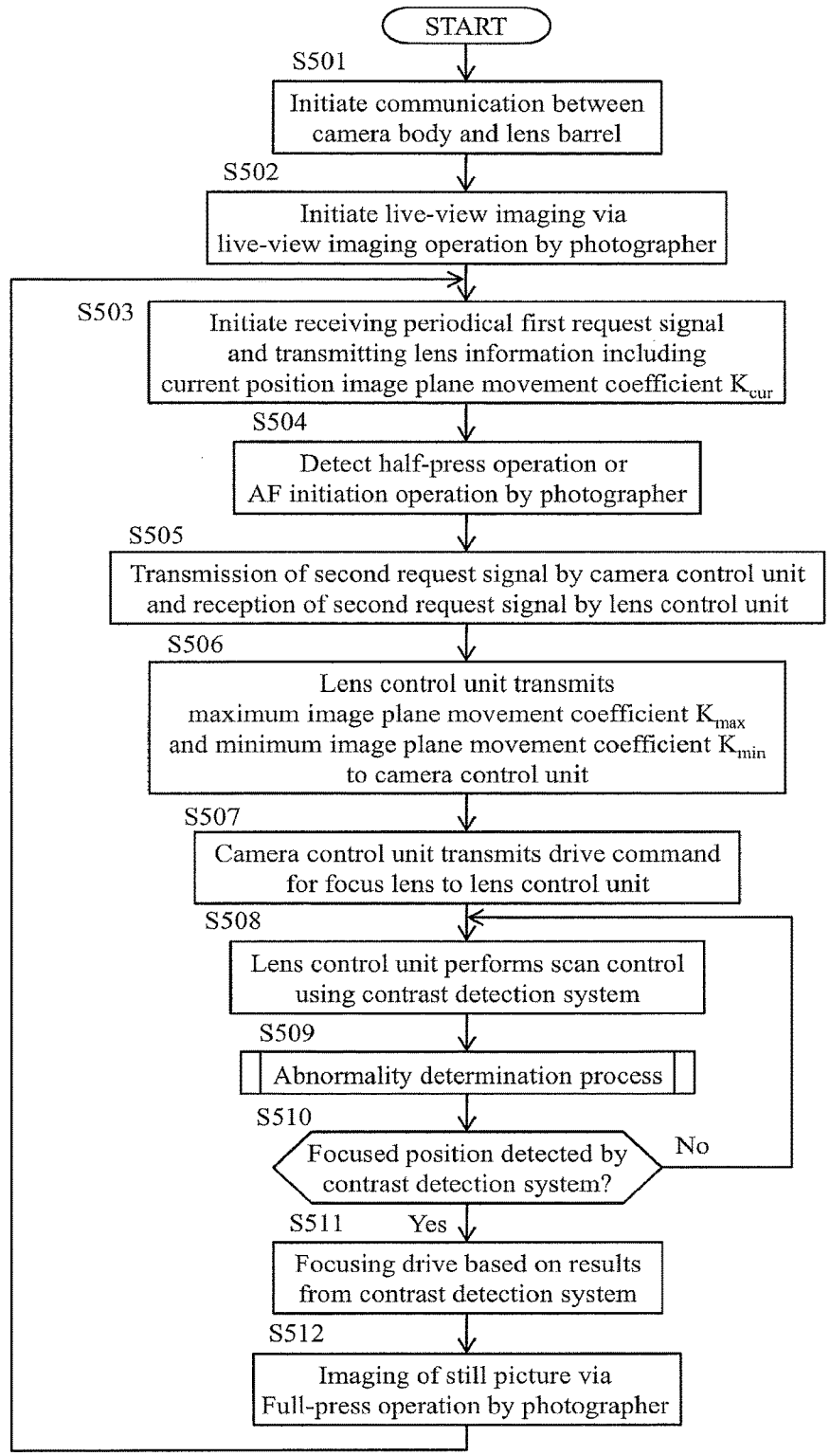
FIG. 14 is a flowchart showing operation according to the fifth embodiment.

The operation shown in FIG. 14 is initiated by the power of the camera 1a being turned on. First at step S501, the camera body 2a performs communication for identifying a lens barrel 3. This is because the available communication format is different depending on the types of lens barrels.

Then at step S502, a determination is made whether or not the live-view imaging ON/OFF switch provided at the operating unit 28 was operated by the photographer, and if the live-view imaging is turned ON, then the mirror system 240 comes at the imaging position to an object, so that the light beams from an object are guided to the imaging device 22a.

At step S503, the stationary communication is initiated between the camera body 2a and the lens barrel 3. In the stationary communication, the lens control unit 36, when receiving the first request signal from the camera control unit 21, repeatedly transmits lens information such as the current position image plane movement coefficient $K_{cur}$ to the camera control unit 21. The stationary communication is repeatedly performed at step S503 and at subsequent steps. It is preferred that the stationary communication is performed repeatedly until the power switch is turned off, for example.

At step S504, a determination is made whether or not a certain operation was performed by the photographer, such as a half-press operation of the release button provided at the operating unit 28 (first switch SW1 turned on) or an AF initiating operation, and if such an operation was performed, then the routine proceeds to step S505 (a case of the half-press operation being done will hereinafter be described in detail).

At step S505, the camera control unit 21 is triggered by the half-press (first switch SW1 turned on) operation by the photographer to transmit the second request signal to the lens control unit 36. Conditions for transmitting the second request signal to the lens control unit 36 may include a case where the photographer performs the AF initiating operation, a case where the half-press of the shutter release button initiates the focus adjustment operation, a case where the photographer performs an operation for driving the zoom lens 32, and a case where the power of the camera 1a is turned on.

At step S506, after receiving the second request signal, the lens control unit 36 refers to the table (see FIG. 6), which is stored in the lens memory 37 and represents the relationship between each lens position and the image plane movement coefficient K, to acquire a maximum image plane movement coefficient $K_{max}$ and a minimum image plane movement coefficient $K_{min}$ that correspond to the current lens position of the zoom lens 32, and transmits the maximum image plane movement coefficient $K_{max}$ and the minimum image plane movement coefficient $K_{min}$ to the camera control unit 21.

At step S507, the camera control unit 21 transmits a scan drive command (instruction to initiate scan drive) to the lens control unit 36 in order to perform the focus detection using the contrast detection system. The scan drive command to the lens control unit 36 (instruction of drive speed for scan drive or instruction of drive position) may be given as the drive speed for the focus lens 33, the image plane movement speed, or the target drive position, etc. Then at step S508, the lens control unit 36 performs the drive control for the focus lens 33 on the basis of the scan drive command.

Then at step S509, the camera control unit 21 performs an abnormality determination process as will be described later. At step S510, the camera control unit 21 determines whether or not a peak value of the focus evaluation value was able to be detected (whether a focused position was able to be detected or not). If a peak value of the focus evaluation value was not able to be detected, the routine returns to step S508, whereas if a peak value of the focus evaluation value was able to be detected, the routine proceeds to step S511.

At step S511, the camera control unit 21 transmits to the lens control unit 36 a command for performing the focusing drive to the position corresponding to the peak value of the focus evaluation value. The lens control unit 36 performs the drive control for the focus lens 33 in response to the received command.

At step S512, the camera control unit 21 makes a determination that the focus lens 33 has reached the position corresponding to the peak value of the focus evaluation value, and performs the imaging control for a still image if the full-press operation (second switch SW2 turned on) was performed by the photographer. After completing the imaging control, the routine returns again to step S503.

The abnormality determination process (see step S509 in FIG. 14) will then be described in detail with reference to FIGS. 15 and 16.

Figure 15:
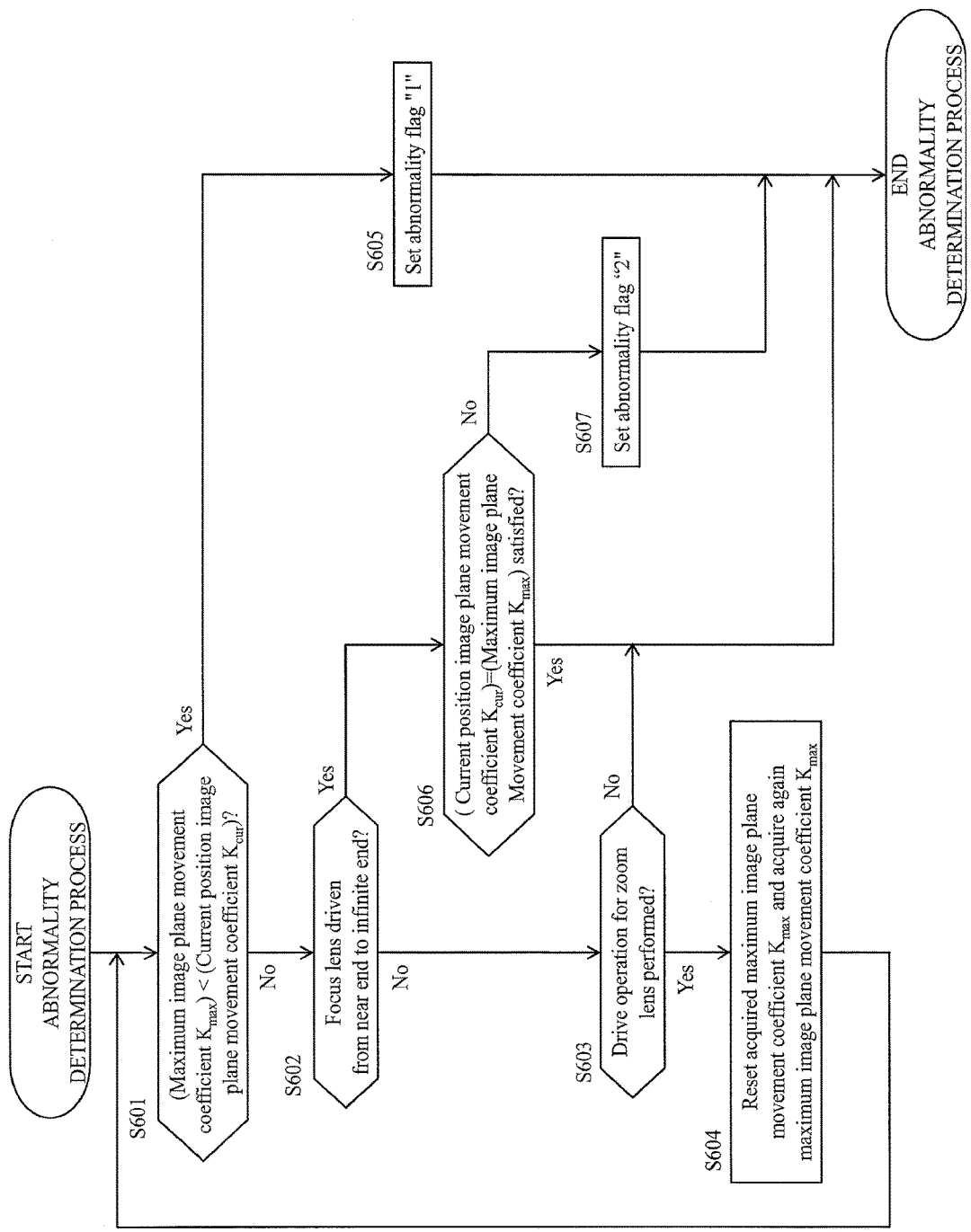
FIG. 15 is a flowchart showing an abnormality determination process according to the fifth embodiment.

The description now refers to FIG. 15. At step S601, a determination is made whether or not the current position image plane movement coefficient $K_{cur}$ acquired repeatedly via the stationary communication is larger than the above-described maximum image plane movement coefficient $K_{max}$ acquired at step S506. That is, it is determined whether or not there was detected a current position image plane movement coefficient $K_{cur}$ satisfying a condition of (Maximum image plane movement coefficient $K_{max}$)<(Current position image plane movement coefficient $K_{cur}$). If a current position image plane movement coefficient $K_{cur}$ satisfying the condition of (Maximum image plane movement coefficient $K_{max}$)<(Current position image plane movement coefficient $K_{cur}$) was detected, then some abnormality is considered to occur, such as communication abnormality between the camera body 2 and the lens barrel 3, and the routine proceeds to step S605 at which an abnormality flag is set "1" to exit the abnormality determination process, followed by step S510 shown in FIG. 14. Note that the abnormality flag is set "0" in a normal condition such as when no abnormality occurs. If, on the other hand, a current position image plane movement coefficient $K_{cur}$ satisfying the condition of (Maximum image plane movement coefficient $K_{max}$)<(Current position image plane movement coefficient $K_{cur}$) is not detected, then the routine proceeds to step S602.

At step S602, a determination is made whether or not the focus lens 33 was driven from the near end to the infinite end while from the time when the power of the camera 1 was turned on to the present time. If the focus lens 33 was driven from the near end to the infinite end, then the routine proceeds to step S606 at which a determination is made whether or not, as a result of driving the focus lens 33 from the near end to the infinite end, a current position image plane movement coefficient $K_{cur}$ satisfying a condition of (Current position image plane movement coefficient $K_{cur}$)=(Maximum image plane movement coefficient $K_{max}$) was able to be detected among those obtained via the stationary communication. If, despite the focus lens 33 driven from the near end to the infinite end, a current position image plane movement coefficient $K_{cur}$ satisfying the condition of (Current position image plane movement coefficient $K_{cur}$)=(Maximum image plane movement coefficient $K_{max}$) was not able to be detected, then some abnormality is considered to occur, such as communication abnormality between the camera body 2 and the lens barrel 3, and the routine proceeds to step S607 at which the abnormality flag is set "2" to exit the abnormality determination process, followed by step S510 shown in FIG. 14. If, at step S606, a current position image plane movement coefficient $K_{cur}$ satisfying the condition of (Current position image plane movement coefficient $K_{cur}$)=(Maximum image plane movement coefficient $K_{max}$) was able to be detected, then the routine exits the abnormality determination process and proceeds to step S510 shown in FIG. 14.

If, at step S602, the focus lens 33 was determined not to be driven from the near end to the infinite end, then the routine proceeds to step S603.

Then at step S603, the camera control unit 21 determines whether the drive operation for the zoom lens 32 was performed or not. If the drive operation for the zoom lens 32 was determined to be performed, the routine proceeds to step S604, whereas if the drive operation for the zoom lens 32 was determined not to be performed, the routine exits the abnormality determination process and proceeds to step S510 shown in FIG. 14.

At step S604, the camera control unit 21 transmits again the second request signal to the lens control unit 36, which then returns to the camera control unit 21 a maximum image plane movement coefficient $K_{max}$ that corresponds to the lens position of the zoom lens 32 after it was driven. In addition, the camera control unit 21 resets the maximum image plane movement coefficient $K_{max}$ and the current position image plane movement coefficient $K_{cur}$ which were obtained before driving the zoom lens 32.

This is because the above-described determinations at steps S601 and S606 are to compare the maximum image plane movement coefficient $K_{max}$ and the current position image plane movement coefficient $K_{cur}$ which were obtained when the zoom lens 32 was at the same lens position, so if the lens position of the zoom lens 32 varies, then the above-described determinations at steps S601 and S606 cannot appropriately be performed unless the maximum image plane movement coefficient $K_{max}$ and the current position image plane movement coefficient $K_{cur}$ are newly collected. After completing the process at step S604, the routine returns to step S601.

Figure 16:
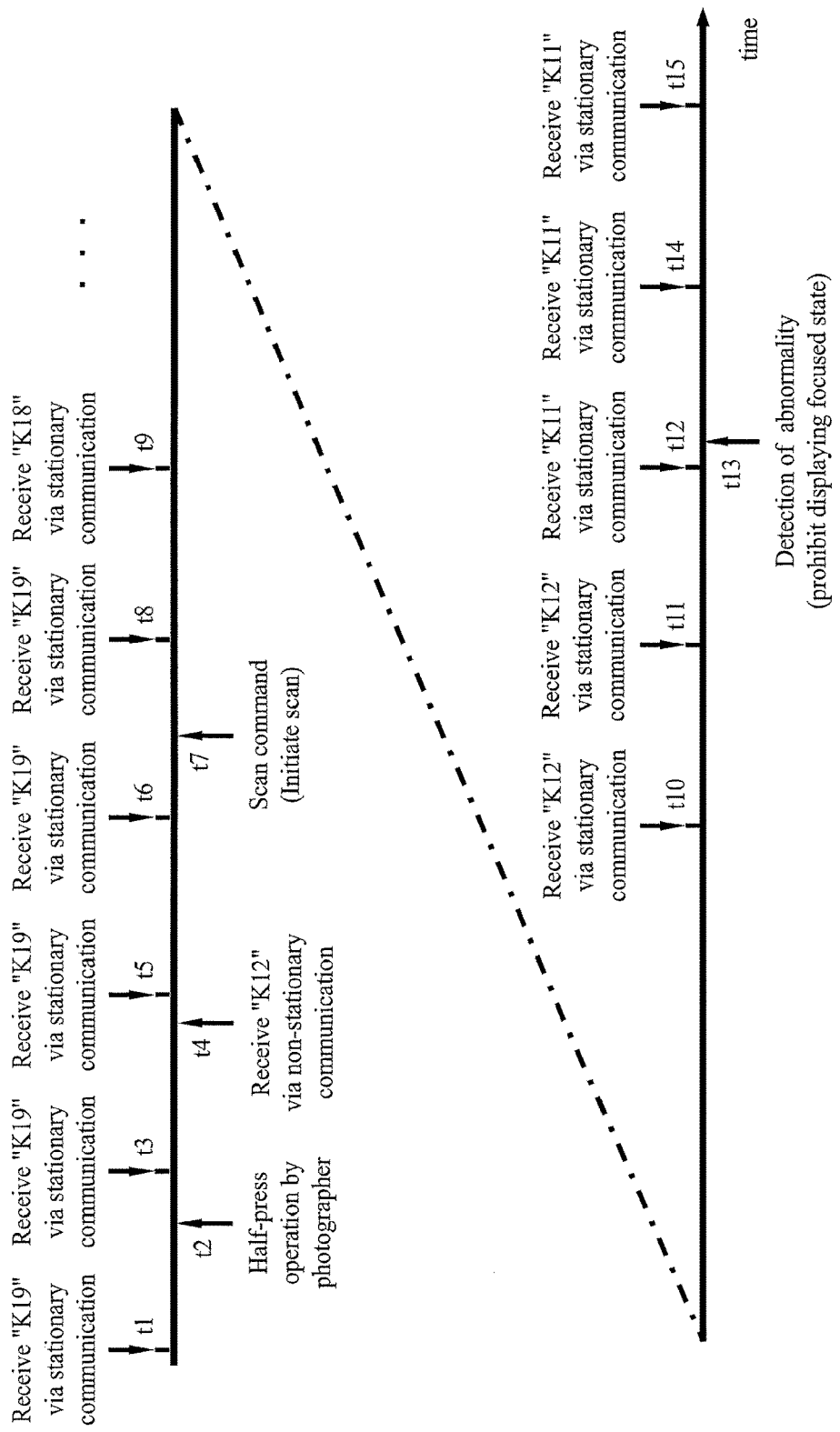
FIG. 16 is a diagram showing an example of one scene for explaining a specific example of the abnormality determination process according to the fifth embodiment.

With reference to FIG. 16, a case where the abnormality flag is set "1" will then be described in detail. The description with reference to FIG. 16 will be directed to an example of the case where the position of the zoom lens (focal distance) is at "f1" (see FIG. 6).

FIG. 16 exemplifies a case where the half-press operation of the shutter release button was performed at time t2 by the photographer, in which case it is assumed that the lens control unit 36 transmits at time t4 to the camera control unit 21 the maximum image plane movement coefficient $K_{max}$ of "K12" rather than "K11". The camera control unit 21 then sends at time t7 the scan drive command to the lens control unit 36. At time t1, t3, t5, t6 before the scan drive command, the maximum image plane movement coefficient $K_{max}$ is "K19" because the focus lens 33 is not moved.

After time t8 at which the scan drive command has been sent, the current position image plane movement coefficient $K_{cur}$ is "K18" at time t9, then "K12" at time t10, then "K11" at time t12.

In this case, the example shown in FIG. 16 is such that the camera control unit 21 receives at time t4 the maximum image plane movement coefficient $K_{max}$ of "K12". Therefore, at time t12, the current position image plane movement coefficient $K_{cur}$ of "K11" larger than "K12" is received, which satisfies the condition of (Maximum image plane movement coefficient $K_{max}$)<(Current position image plane movement coefficient $K_{cur}$) (see step S601 shown in FIG. 15), so that the abnormality flag is set "1" (see step S605 shown in FIG. 15).

In the above-described embodiment, if the abnormality flag was set "1" at step S605 (if a current position image plane movement coefficient $K_{cur}$ satisfying the condition of (Maximum image plane movement coefficient $K_{max}$)<(Current position image plane movement coefficient $K_{cur}$) was detected), or if the abnormality flag was set "2" at step S606 (if, despite the focus lens 33 driven from the near end to the infinite end, a current position image plane movement coefficient $K_{cur}$ satisfying the condition of (Current position image plane movement coefficient $K_{cur}$)=(Maximum image plane movement coefficient $K_{max}$) was not able to be detected), then some abnormality is considered to occur, such as communication abnormality between the camera body 2 and the lens barrel 3.

If the abnormality flag was set "1" or "2", it is preferred to perform a process for abnormality. The process for abnormality may preferably include prohibiting display of focused state such as using the electronic viewfinder 26, for example. If the abnormality flag was set "1" or "2", then abnormalities such as communication abnormality, circuit abnormality and power abnormality may possibly occur, so the reliability in AF cannot be ensured. For this reason, it is preferred to perform the process for abnormality, such as prohibiting display of focused state, for the purpose of avoiding "display of focused state" with low reliability. Note that, if at step S509 the abnormality flag is set "1" or "2" and display of focused state is inhibited, then display of focused state is not to be performed even when the focus lens 33 reaches the focused position at step S511.

If the abnormality flag was set "1" or "2", then, alternatively or in addition to performing the process of prohibiting display of focused state, it is also preferred to perform a whole range search that drives the focus lens 33 from the near end to the infinite end, for example. By performing the whole range search, causes for the abnormality may be confirmed to disappear.

It is further preferred to perform the whole range search such that the focus lens 33 is driven from the near end to the infinite end using a second drive speed that is sufficiently lower than a first drive speed as the normal drive speed. This is because a sufficiently low second drive speed allows the whole range search to be performed safely. This is also because, if the drive speed for the focus lens 33 was too high to detect a current position image plane movement coefficient $K_{cur}$ satisfying the condition of (Current position image plane movement coefficient $K_{cur}$)=(Maximum image plane movement coefficient $K_{max}$), then the whole range search using a sufficiently low second drive speed may allow detecting such a current position image plane movement coefficient $K_{cur}$.

If the abnormality flag was set "1" or "2", then, alternatively or in addition to the process of prohibiting display of focused state and/or the process of performing the whole range search using a sufficiently low second speed, a further process may be performed such as for prohibiting both the focus detection using the phase difference detection system and the focus detection using the contrast detection system. In particular, if the abnormality flag is set "1" or "2" so that some abnormality such as communication abnormality is considered to occur, then the possibility that a successful focus detection result cannot be obtained is high even when the focus detection using the phase difference detection system and the focus detection using the contrast detection system are performed, and hence, in such a case the focus detection using the phase difference detection system and the focus detection using the contrast detection system may be prohibited.

In the fifth embodiment, if the abnormality flag was once set "1" or "2", then some abnormality such as communication abnormality is considered to occur, and it is thus preferred that the abnormality flag remains set "1" or "2" without being reset until the power is turned off or the lens barrel 3 is replaced.

In the fifth embodiment, the reliability in AF cannot be ensured if, for example, the abnormality flag is set "1" or "2" at step S509 shown in FIG. 14, and hence, to avoid meaningless drive of the focus lens 33, a process may be performed to prohibit drive of the focus lens 33 regardless of whether or not the camera control unit 21 was able to detect the peak value at step S510. In this case, it is preferred that the focus lens 33 is prohibited from being driven until the power is turned off or the lens barrel 3 is replaced.

If the abnormality flag is set "1" or "2" at step S509 shown in FIG. 14, for example, then the camera control unit 21 may perform one or more additional processes, such as a process of performing the whole range search using a sufficiently low second drive speed regardless of whether or not the peak value was able to be detected at step S510, a process of prohibiting at least one of the focus detection using the phase difference detection system and the focus detection using the contrast detection system, a process of turning off the power of the camera, and a process of displaying an alert that some abnormality occurs.

The reliability in AF cannot be ensured if, for example, the abnormality flag is set "1" or "2" at step S509 shown in FIG. 14, and a further process may therefore be possible such that the camera control unit 21 does not perform the focusing drive at step S511 even when the peak value was detected at step S510.

Sixth Embodiment

A sixth embodiment according to the present invention will then be described. In the sixth embodiment, the description of a similar configuration to that of the above-described fifth embodiment will be omitted.

The operation according to the sixth embodiment described below can be executed in combination with any of those according to the above-described first to fifth embodiments, or solely executed separately from those according to the first to fifth embodiments.

Figure 18:
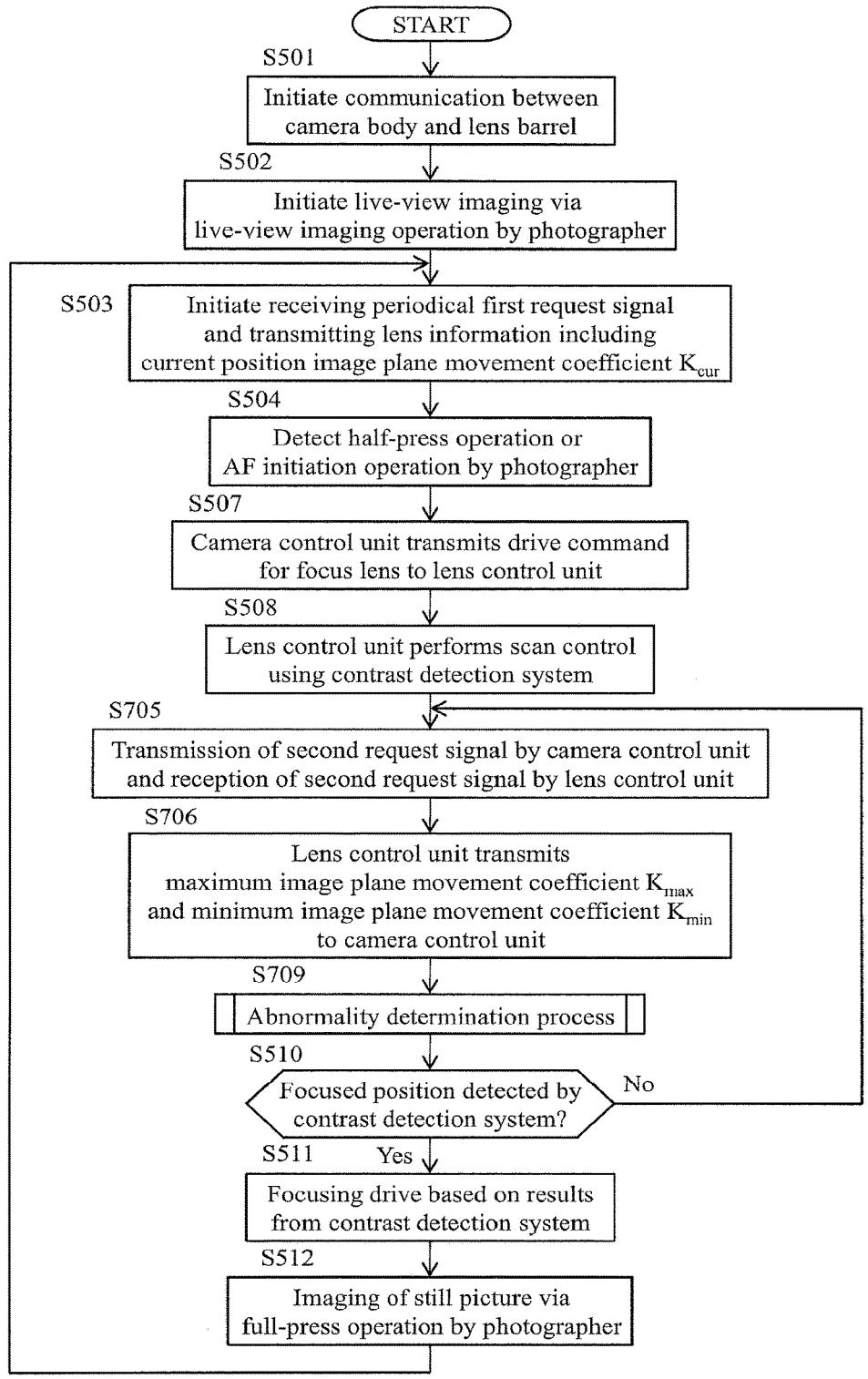
FIG. 18 is a flowchart showing operation according to a sixth embodiment.

In the sixth embodiment shown in FIG. 18, steps S501-S504, S507, S508 and S510-S512 are similar to those in FIG. 14, so the detailed explanation will be omitted. At step S504, a determination is made whether or not a certain operation was performed, such as a half-press operation of the release button (first switch SW1 turned on) or an AF initiating operation, and if such an operation was performed, then the routine proceeds to step S507 at which the camera control unit 21 transmits a scan drive command to the lens control unit 36, followed by step S508 at which the lens control unit 36 performs the drive control for the focus lens 33 on the basis of the scan drive command.

Then at step S705, the camera control unit 21 is triggered by the scan drive command (see step S507) to the lens control unit 36 to periodically transmit the second request signal to the lens control unit 36. The condition for transmitting the second request signal to the lens control unit 36 may be based on, for example, a trigger at a timing when the camera control unit 21 detects that the lens control unit 36 actually initiates the drive control for the focus lens 33, or a trigger at a timing when a certain signal is transmitted from the lens control unit 36 to the camera control unit 21 after the scan drive command, etc. The second request signal may be transmitted concurrently with the scan drive command to the lens control unit 36.

It is preferred in the present embodiment that the camera control unit 21 periodically transmits the second request signal until a condition for stopping the transmission of the second request signal is satisfied as will be described later. The period at which the second request signal is transmitted may preferably be shorter than the period at which the first request signal is transmitted. For example, it may preferably be half or less the period at which the first request signal is transmitted.

Then at step S706, while periodically receiving the second request signal, the lens control unit 36 refers to the table (see FIG. 6), which is stored in the lens memory 37 and represents the relationship between each lens position and the image plane movement coefficient K, to acquire a maximum image plane movement coefficient $K_{max}$ and a minimum image plane movement coefficient $K_{min}$ that correspond to the current lens position of the zoom lens 32, and periodically transmits the maximum image plane movement coefficient $K_{max}$ and the minimum image plane movement coefficient $K_{min}$ to the camera control unit 21.

Then at step S709, the camera control unit 21 performs an abnormality determination process as will be described later. For example, the camera control unit 21 can periodically perform the abnormality determination, while periodically transmitting the second request signal, using a trigger at a timing when transmitting the second request signal or at a timing when receiving the maximum image plane movement coefficient $K_{max}$ and the minimum image plane movement coefficient $K_{min}$. Transmitting the second request signal at a short period allows the abnormality determination to be performed at the short period, and a successful abnormal determination can thus be achieved.

Then at step S510, the camera control unit 21 determines whether or not a peak value of the focus evaluation value was able to be detected (whether a focused position was able to be detected or not). If a peak value of the focus evaluation value was not able to be detected, the routine returns to step S508. If a peak value of the focus evaluation value was able to be detected, then the routine proceeds to step S511 at which the camera control unit 21 stops the periodical transmission of the second request signal. The condition for stopping the transmission of the second request signal may be based on, for example, a trigger at a timing when a command for the focusing drive is transmitted to the lens control unit 36, when the focus lens 33 reaches a position that corresponds to the peak value of the focus evaluation value, when the camera control unit 21 determines that a peak position cannot be detected, when the camera control unit 21 determines to end the scan operation, when the camera control unit 21 determines to end the contrast AF control, or when the camera control unit 21 determines to end the live-view display, etc. It is preferred that the first request signal is periodically transmitted from before a time when the periodical transmission of the second request signal is started to after a time when the periodical transmission of the second request signal is ended. In other words, the time period during which the second request signal is periodically transmitted is included in the time period during which the first request signal is periodically transmitted.

The abnormality determination process (see step S709 in FIG. 18) will then be described in detail with reference to FIG. 19. In FIG. 19, steps S602-S605 and S607 are similar to those in FIG. 15, so the detailed explanation will be omitted.

At step S801 shown in FIG. 19, a determination is made whether or not the current position image plane movement coefficient $K_{cur}$ acquired repeatedly via the stationary communication is larger than the above-described maximum image plane movement coefficient $K_{max}$ acquired at step S706 or smaller than the minimum image plane movement coefficient $K_{min}$. If a current position image plane movement coefficient $K_{cur}$ satisfying the condition of (Maximum image plane movement coefficient $K_{max}$)<(Current position image plane movement coefficient $K_{cur}$) or (Minimum image plane movement coefficient $K_{min}$)>(Current position image plane movement coefficient $K_{cur}$) was detected, then some abnormality is considered to occur, such as communication abnormality between the camera body 2 and the lens barrel 3, and the routine proceeds to step S605 at which the abnormality flag is set "1" to exit the abnormality determination process, followed by step S510 shown in FIG. 18. If, on the other hand, a current position image plane movement coefficient $K_{cur}$ satisfying the condition of (Maximum image plane movement coefficient $K_{max}$)<(Current position image plane movement coefficient $K_{cur}$) or (Minimum image plane movement coefficient $K_{min}$)>(Current position image plane movement coefficient $K_{cur}$) is not detected, then the routine proceeds to step S602.

If, at step S602, it was determined that the focus lens 33 was driven from the near end to the infinite end, then the routine proceeds to step S806. At step S806, a determination is made whether or not, as a result of driving the focus lens 33 from the near end to the infinite end, a current position image plane movement coefficient $K_{cur}$ satisfying a condition of (Current position image plane movement coefficient $K_{cur}$)=(Maximum image plane movement coefficient $K_{max}$) and (Current position image plane movement coefficient $K_{cur}$)=(Minimum image plane movement coefficient $K_{min}$) was able to be detected among those obtained via the stationary communication. If, despite the focus lens 33 driven from the near end to the infinite end, a current position image plane movement coefficient $K_{cur}$ satisfying the condition of (Current position image plane movement coefficient $K_{cur}$)=(Maximum image plane movement coefficient $K_{max}$) and (Current position image plane movement coefficient $K_{cur}$)=(Minimum image plane movement coefficient $K_{min}$) was not able to be detected, then some abnormality is considered to occur, such as communication abnormality between the camera body 2 and the lens barrel 3, and the routine proceeds to step S607 at which the abnormality flag is set "2" to exit the abnormality determination process, followed by step S510 shown in FIG. 18. If, at step S806, a current position image plane movement coefficient $K_{cur}$ satisfying the condition of (Current position image plane movement coefficient $K_{cur}$)=(Maximum image plane movement coefficient $K_{max}$) and (Current position image plane movement coefficient $K_{cur}$)=(Minimum image plane movement coefficient $K_{min}$) was able to be detected, then the routine exits the abnormality determination process and proceeds to step S510 shown in FIG. 18.

It should be appreciated that the embodiments heretofore explained are described to facilitate understanding of the present invention and are not described to limit the present invention. Therefore, it is intended that the elements disclosed in the above embodiments include all design changes and equivalents to fall within the technical scope of the present invention. In addition, two or more of the above-described embodiments may appropriately be combined for use.

For example, the above-described embodiments employ the value calculated by (Movement amount of image plane)/(Drive amount of focus lens 33) as the image plane movement coefficient K, but the image plane movement coefficient K may be a value calculated by (Drive amount of focus lens 33)/(Movement amount of image plane).

For example, if the value calculated by (Movement amount of image plane)/(Drive amount of focus lens 33) is employed as the image plane movement coefficient K, then, as the value (absolute value) increases, the movement amount of the image plane when the focus lens is driven by a certain value (e.g. 1 mm) increases. If the value calculated by (Drive amount of focus lens 33)/(Movement amount of image plane) is employed as the image plane movement coefficient K, then, as the value (absolute value) increases, the movement amount of the image plane when the focus lens is driven by a certain value (e.g. 1 mm) decreases.

According to the above-described embodiments, if, at step S601 shown in FIG. 15, a current position image plane movement coefficient $K_{cur}$ satisfying the condition of (Maximum image plane movement coefficient $K_{max}$)<(Current position image plane movement coefficient $K_{cur}$) was detected, then some abnormality is considered to occur, such as communication abnormality between the camera body 2 and the lens barrel 3, and the abnormality flag is accordingly set "1" (step S605), while on the other hand, if a current position image plane movement coefficient $K_{cur}$ satisfying the condition of (Maximum image plane movement coefficient $K_{max}$)<(Current position image plane movement coefficient $K_{cur}$) is not detected, then the abnormality flag is set "0" (the routine proceeds to step S602), but the present invention is not limited to the above.

For example, the above procedure may be modified such that, if, at step S601 shown in FIG. 15, a current position image plane movement coefficient $K_{cur}$ satisfying the condition of (Minimum image plane movement coefficient $K_{min}$)>(Current position image plane movement coefficient $K_{cur}$) was detected, then some abnormality is considered to occur, such as communication abnormality between the camera body 2 and the lens barrel 3, and the abnormality flag is accordingly set "1" (step S605), while on the other hand, if a current position image plane movement coefficient $K_{cur}$ satisfying the condition of (Minimum image plane movement coefficient $K_{min}$)>(Current position image plane movement coefficient $K_{cur}$) is not detected, then the abnormality flag is set "0" (the routine proceeds to step S602).

According to the above-described embodiments, despite the focus lens 33 driven from the near end to the infinite end, if, at step S606 shown in FIG. 15, a current position image plane movement coefficient $K_{cur}$ satisfying the condition of (Current position image plane movement coefficient $K_{cur}$)=(Maximum image plane movement coefficient $K_{max}$) was not able to be detected, then some abnormality is considered to occur, such as communication abnormality between the camera body 2 and the lens barrel 3, and the abnormality flag is accordingly set "2" (step S607), while on the other hand, if a current position image plane movement coefficient $K_{cur}$ satisfying the condition of (Current position image plane movement coefficient $K_{cur}$)=(Maximum image plane movement coefficient $K_{max}$) was able to be detected, then the abnormality flag is set "0" (the routine exits the abnormality determination process), but the present invention is not limited to the above.

For example, the above procedure may be modified such that, despite the focus lens 33 driven from the near end to the infinite end, if, at step S606 shown in FIG. 15, a current position image plane movement coefficient $K_{cur}$ satisfying the condition of (Current position image plane movement coefficient $K_{cur}$)=(Minimum image plane movement coefficient $K_{min}$) was not able to be detected, then some abnormality is considered to occur, such as communication abnormality between the camera body 2 and the lens barrel 3, and the abnormality flag is accordingly set "2" (step S607), while on the other hand, if a current position image plane movement coefficient $K_{cur}$ satisfying the condition of (Current position image plane movement coefficient $K_{cur}$)=(Minimum image plane movement coefficient $K_{min}$) was able to be detected, then the abnormality flag is set "0" (the routine exits the abnormality determination process).

According to the above-described embodiments, abnormalities such as communication abnormality can be detected by a simple process using at least one of the minimum image plane movement coefficient $K_{min}$ and the maximum image plane movement coefficient $K_{max}$ thereby to result in a considerably advantageous effect that a focus adjustment control apparatus can be provided with high reliability.

The above-described embodiments are configured such that the lens memory 37 stores the table which is shown in FIG. 6 and represents the relationship between each lens position and the image plane movement coefficient K, but a modified configuration may also be possible such that the lens control unit 36 rather than the lens memory 37 stores the table. The above-described embodiments are configured to store the table which is shown in FIG. 6 and represents the relationship between the lens position of the zoom lens 32 and the lens position of the focus lens 33, and the image plane movement coefficient K, but may be modified to use a table which represents the relationship between the lens position only of the zoom lens 32 and the image plane movement coefficient K, or a table which represents the relationship between the lens position only of the focus lens 33 and the image plane movement coefficient K. In particular, depending on the type, some lens barrels 3 are such that, if the lens position of the zoom lens 32 is the same, the variation in the image plane movement coefficient K is very small even when the lens position of the focus lens 33 varies, and in such a case it may be useful to use a table which represents the relationship between the lens position only of the zoom lens 32 and the image plane movement coefficient K. If the lens barrel 3 consists essentially of a single focus lens, it may be useful to use a table which represents the relationship between the lens position only of the focus lens 33 and the image plane movement coefficient K.

The above-described embodiments are configured to store the table which represents the relationship between the lens position of the zoom lens 32 and the lens position of the focus lens 33, and the image plane movement coefficient K, but may further comprise a table that stores additional data with consideration for ambient temperature and attitude of the camera 1.

The above-described embodiments are configured such that the lens control unit 36 transmits the maximum image plane movement coefficient $K_{max}$ and the minimum image plane movement coefficient $K_{min}$ in response to the request signal from the camera control unit 21, but the present invention is not limited to such a configuration. An alternative embodiment may be configured, for example, such that the lens control unit 36 transmits the maximum image plane movement coefficient $K_{max}$ and the minimum image plane movement coefficient $K_{min}$ such as when receiving from the camera control unit 21 a signal for driving the zoom lens 32, when receiving from the camera control unit 21 a signal that notifies that the shutter release button was half pressed, or when receiving from the camera control unit 21 a signal that notifies that the focus adjustment operation was initiated due to the half-press of the shutter release button, rather than in response to the request signal from the camera control unit 21. In a further embodiment, the lens control unit 36 may be configured to transmit either one of the maximum image plane movement coefficient $K_{max}$ or the minimum image plane movement coefficient $K_{min}$ that represents a minimum value among the image plane movement coefficients K set for respective lens positions of the zoom lens 32, in which case the lens control unit 36 may perform the transmission in response to the transmission request of the maximum image plane movement coefficient $K_{max}$ or the minimum image plane movement coefficient $K_{min}$ from the camera control unit 21, or the lens control unit 36 may also perform the transmission such as when receiving a signal for driving the zoom lens 32 even without the transmission request as in the above.

In the above-described second to fourth embodiments, a scheme of drive for reducing play has been described such that, when performing the focusing drive for the focus lens 33, the focus lens 33 is caused to once pass through the focused position and then driven reversely to the focused position, but another scheme of drive for reducing play may also be employed in which, when performing the focusing drive, a play amount is added to the drive amount required for driving the focus lens 33 to the focused position. In this case, if the drive for reducing play is not performed, the focus lens 33 may be driven to the focused position without addition of a play amount.

The camera 1 according to the above-described embodiments is not particularly limited, and the present invention may for example be applied to a digital video camera, a built-in lens type digital camera, a camera for mobile phones, a scope, a field scope, or other optical devices.

The present invention is not limited to those capable of storing the image plane movement coefficient K in the lens memory 37 so long as the maximum image plane movement coefficient $K_{max}$ can be transmitted. For example, the maximum image plane movement coefficient $K_{max}$ may be calculated such as using the zoom lens position, and the calculated maximum image plane movement coefficient $K_{max}$ may be transmitted to the camera body 2. In a similar manner, the minimum image plane movement coefficient $K_{min}$ may be calculated such as using the zoom lens position, and the calculated minimum image plane movement coefficient $K_{min}$ may be transmitted to the camera body 2.

It is also preferred that, if the maximum image plane movement coefficient $K_{max}$ or the minimum image plane movement coefficient $K_{min}$ varies even though the position of the zoom lens does not vary, for example, then it is determined that an abnormality occurs, and an appropriate process may be performed like in the case where the abnormality flag is set "1" or "2" as shown in FIG. 15.

The maximum image plane movement coefficient $K_{max}$ stored in the lens memory 37 may also be those shown in FIG. 17. The minimum image plane movement coefficient $K_{min}$ may also be configured in a similar manner to that for the maximum image plane movement coefficient $K_{max}$, but detailed illustration is omitted.

The maximum image plane movement coefficient $K_{max}$ and the minimum image plane movement coefficient $K_{min}$ stored in the lens memory 37 may each be an integer, a value including a fraction after the decimal point, an index number, or a logarithmic number. The maximum image plane movement coefficient $K_{max}$ and the minimum image plane movement coefficient $K_{min}$ may each be a decimal number or a binary number, etc.

The present invention is not limited to those in which the electrical contacts of the mount unit 401 of the camera body 2 and the electrical contacts of the mount unit 402 of the lens barrel 3 are connected with one another, so long as the maximum image plane movement coefficient $K_{max}$ can be transmitted to the camera body 2. For example, the maximum image plane movement coefficient $K_{max}$ may be transmitted using a wireless communication line from the lens barrel 3 to the camera body 2.

1 . . . Digital camera
  2 . . . Camera body
    21 . . . Camera control unit
    22 . . . Imaging device
      221 . . . Imaging pixels
      222a, 222b . . . Focus detection pixels
3 . . . Lens barrel
  32 . . . Zoom lens
  33 . . . Focus lens
  36 . . . Lens control unit
  37 . . . Lens memory

What is claimed is:

1. An exchangeable lens configured to be attached to a camera body, the exchangeable lens comprising:
an optical system comprising a focus adjustment lens;
a driver configured to drive the focus adjustment lens in a direction of an optical axis of the optical system; and
a transmitter configured to transmit a first value, a second value and a third value to the camera body, wherein
the first value being an image plane movement coefficient at a lens position of the focus adjustment lens, the image plane movement coefficient corresponding to a movement amount of an image plane with regard to a movement amount of the focus adjustment lens, the first value varying depending on the lens position of the focus adjustment lens,
the second value being an image plane movement coefficient which maximizes the movement amount of the image plane with regard to the movement amount of the focus adjustment lens within a drive range of the focus adjustment lens driven by the driver, and
the third value being an image plane movement coefficient which minimizes the movement amount of the image plane with regard to the movement amount of the focus adjustment lens within the drive range of the focus adjustment lens driven by the driver.

2. The exchangeable lens according to claim 1 further comprising a receiver configured to receive control information for controlling drive of the driver, wherein
the transmitter is configured to transmit the first value, the second value and the third value to the camera body before the receiver receives the control information,
the driver is configured to start the drive of the focus adjustment lens for detecting a focused position of the optical system based on the control information, and
the transmitter is configured to repeatedly transmit the first value, the second value and the third value to the camera body while the focus adjustment lens is driven.

3. The exchangeable lens according to claim 1, wherein the first value, the second value and the third value are information for determining reliability of detection of a focused position of the optical system.

4. The exchangeable lens according to claim 2, wherein the focused position of the optical system is the lens position of the focus adjustment lens which maximizes a focus evaluation value of the optical system.

5. The exchangeable lens according to claim 1, wherein the transmitter is configured to transmit the second value and the third value when an operation is performed on the camera body.

6. The exchangeable lens according to claim 2, wherein
the receiver is configured to receive a first signal and a second signal different from the first signal, and
the transmitter is configured to transmit the first value after the first signal is received and transmit the second value and the third value after the second signal is received.

7. The exchangeable lens according to claim 6, wherein the receiver is configured to receive the first signal at a first timing and receive the second signal at a second timing different from the first timing.

8. The exchangeable lens according to claim 1 further comprising a zoom optical system configured to vary a focus distance of the exchangeable lens, wherein
the second value and the third value vary depending on a lens position of the zoom optical system.

9. The exchangeable lens according to claim 1, wherein the image plane movement coefficient corresponding to the first value corresponds to $T_I/T_L$ where $T_L$ is the movement amount of the focus adjustment lens and $T_I$ is the movement amount of the image plane.

10. The exchangeable lens according to claim 1 further comprising a storage configured to store the second value and the third value.

11. A camera body capable of attaching the exchangeable lens according to claim 1, the camera body comprising:
a receiver configured to receive the first value, the second value and the third value from the exchangeable lens, and
a controller configured to determine whether the exchangeable lens is abnormal based on the first value, the second value and the third value.

* * * * *